United States Patent
Okawa et al.

(10) Patent No.: US 11,543,789 B2
(45) Date of Patent: Jan. 3, 2023

(54) REINFORCEMENT LEARNING METHOD, RECORDING MEDIUM, AND REINFORCEMENT LEARNING SYSTEM

(71) Applicant: FUJITSU LIMITED, Kawasaki (JP)

(72) Inventors: Yoshihiro Okawa, Yokohama (JP); Tomotake Sasaki, Kawasaki (JP); Hidenao Iwane, Kawasaki (JP); Hitoshi Yanami, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 174 days.

(21) Appl. No.: 16/797,515

(22) Filed: Feb. 21, 2020

(65) Prior Publication Data
US 2020/0285208 A1    Sep. 10, 2020

(30) Foreign Application Priority Data
Mar. 4, 2019    (JP) .............................. JP2019-039032

(51) Int. Cl.
*G05B 19/04* (2006.01)
*G05B 19/042* (2006.01)
(Continued)

(52) U.S. Cl.
CPC ........... *G05B 19/042* (2013.01); *G06N 7/005* (2013.01); *G06N 20/00* (2019.01); *G05B 2219/2619* (2013.01)

(58) Field of Classification Search
CPC .......... G05B 19/042; G05B 2219/2619; G05B 13/0265; G05B 2219/34082;
(Continued)

(56) References Cited

U.S. PATENT DOCUMENTS

| 6,920,385 B2 * | 7/2005 | Egami .................... G05G 1/30 701/96 |
| 8,429,097 B1 | 4/2013 | Sivasubramanian et al. |

(Continued)

FOREIGN PATENT DOCUMENTS

| JP | 2007-65929 A | 3/2007 |
| JP | 2008-111077 A | 5/2008 |

(Continued)

OTHER PUBLICATIONS

Doya, K., "Reinforcement Learning in Continuous Time and Space," Neural Computation, vol. 12, No. 1, Jan. 2000, pp. 1-29.
(Continued)

*Primary Examiner* — Tuan C Dao
(74) *Attorney, Agent, or Firm* — Xsensus LLP

(57) ABSTRACT

A reinforcement learning method executed by a computer includes calculating a degree of risk for a state of a controlled object at a current time point with respect to a constraint condition related to the state of the controlled object, the degree of risk being calculated based on a predicted value of the state of the controlled object at a future time point, the predicted value being obtained from model information defining a relationship between the state of the controlled object and a control input to the controlled object; and determining the control input to the controlled object at the current time point, from a range defined according to the calculated degree of risk so that the range becomes narrower as the calculated degree of risk increases.

13 Claims, 21 Drawing Sheets

(51) Int. Cl.
*G06N 7/00* (2006.01)
*G06N 20/00* (2019.01)

(58) Field of Classification Search
CPC .... G05B 19/0426; G06N 7/005; G06N 20/00; G06N 3/006
See application file for complete search history.

(56) References Cited

U.S. PATENT DOCUMENTS

| | | | | |
|---|---|---|---|---|
| 8,706,357 | B1* | 4/2014 | van den Heuvel | B64D 45/00 701/14 |
| 10,581,974 | B2 | 3/2020 | Sustaeta et al. | |
| 2004/0181334 | A1* | 9/2004 | Blumbergs | G01C 21/26 701/538 |
| 2008/0120335 | A1* | 5/2008 | Dolgoff | G05B 23/0216 |
| 2009/0132095 | A1 | 5/2009 | Sekiai et al. | |
| 2011/0184555 | A1* | 7/2011 | Kosuge | B25J 11/00 700/245 |
| 2011/0314796 | A1* | 12/2011 | Nakamura | F02D 41/1466 60/276 |
| 2012/0253514 | A1 | 10/2012 | Sugimoto et al. | |
| 2013/0214939 | A1* | 8/2013 | Washlow | G01S 7/022 340/901 |
| 2014/0321839 | A1* | 10/2014 | Armstrong | F24D 19/1063 392/498 |
| 2015/0133339 | A1* | 5/2015 | Prindle | C12Q 1/6897 506/10 |
| 2015/0236549 | A1* | 8/2015 | Budde | H02J 9/061 307/23 |
| 2016/0041074 | A1* | 2/2016 | Pliskin | F24F 11/30 435/3 |
| 2017/0051681 | A1* | 2/2017 | Arias Chao | F01K 13/02 |
| 2017/0061796 | A1* | 3/2017 | Osagawa | G05D 1/0289 |
| 2017/0217477 | A1* | 8/2017 | Akatsuka | B62D 5/0463 |
| 2017/0255177 | A1 | 9/2017 | Tokuda et al. | |
| 2017/0364831 | A1 | 12/2017 | Ghosh et al. | |
| 2018/0043531 | A1 | 2/2018 | Matsumoto et al. | |
| 2018/0230967 | A1* | 8/2018 | Beatrice | F03D 17/00 |
| 2019/0028492 | A1* | 1/2019 | Coleman | G06Q 10/06398 |
| 2019/0121350 | A1 | 4/2019 | Cella et al. | |
| 2020/0266743 | A1 | 8/2020 | Li et al. | |
| 2021/0201176 | A1 | 7/2021 | Dhingra | |
| 2021/0278825 | A1 | 9/2021 | Wen et al. | |

FOREIGN PATENT DOCUMENTS

| | | |
|---|---|---|
| JP | 2009-128972 A | 6/2009 |
| JP | 2009-198137 A | 9/2009 |
| JP | 2012-053505 A | 3/2012 |
| JP | 2013-206363 A | 10/2013 |
| JP | 2017-157112 A | 9/2017 |
| JP | 2018-24036 A | 2/2018 |
| JP | 2018-178900 A | 11/2018 |
| JP | 2018-185678 A | 11/2018 |

OTHER PUBLICATIONS

Summers, T., et al., "Stochastic optimal power flow based on conditional value at risk and distributional robustness." International Journal of Electrical Power & Energy Systems, vol. 72, Elsevier Science, Nov. 2015, pp. 116-125.

U.S. Office Action dated Mar. 18, 2022, in related U.S. Appl. No. 16/797,573.

U.S. Office Action dated Aug. 5, 2022, in corresponding U.S. Appl. No. 16/797,573.

Japanese Office Action dated Nov. 1, 2022, in corresponding Japanese Patent Application No. 2019-039032, 6 pp.

* cited by examiner

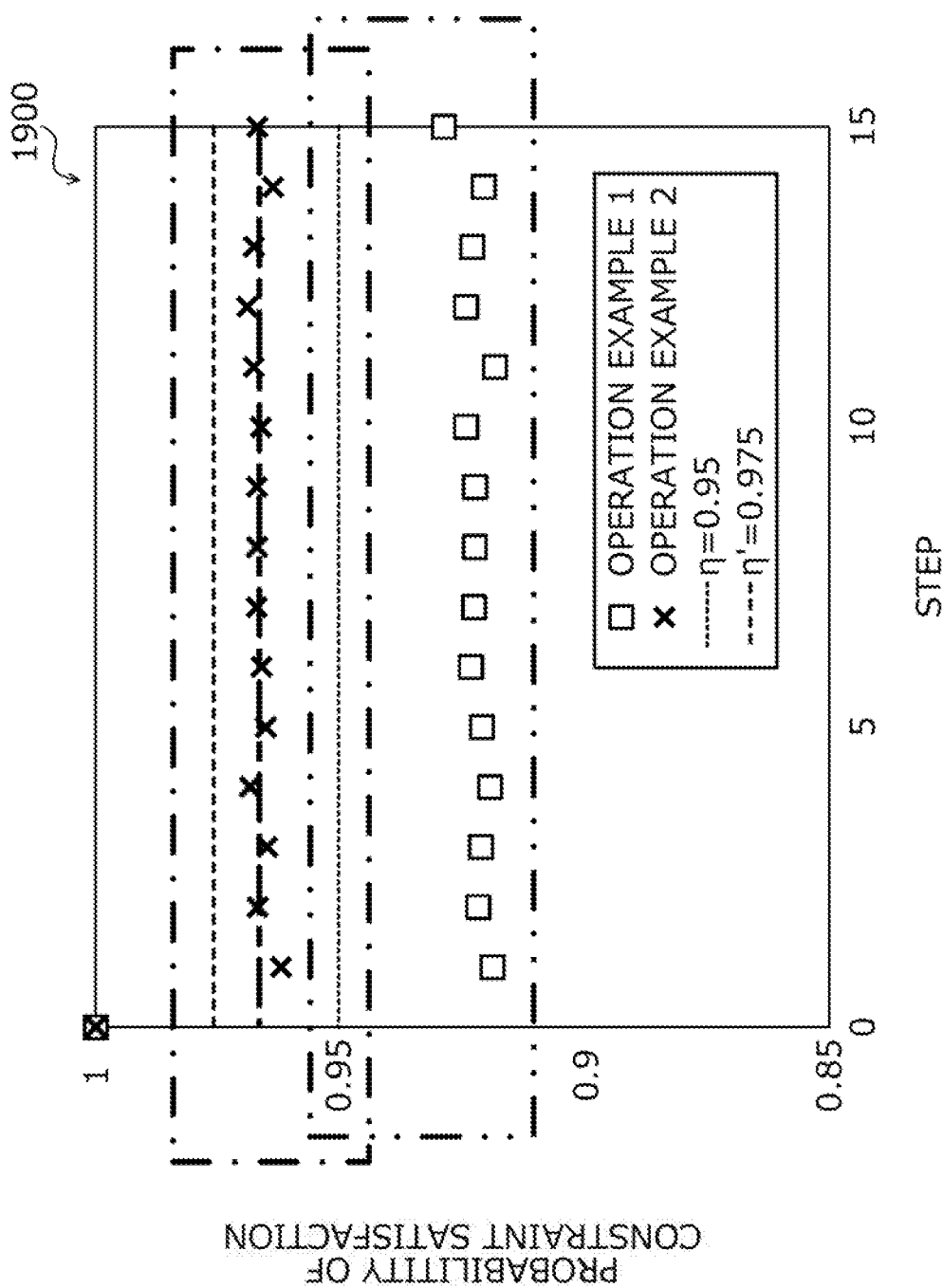

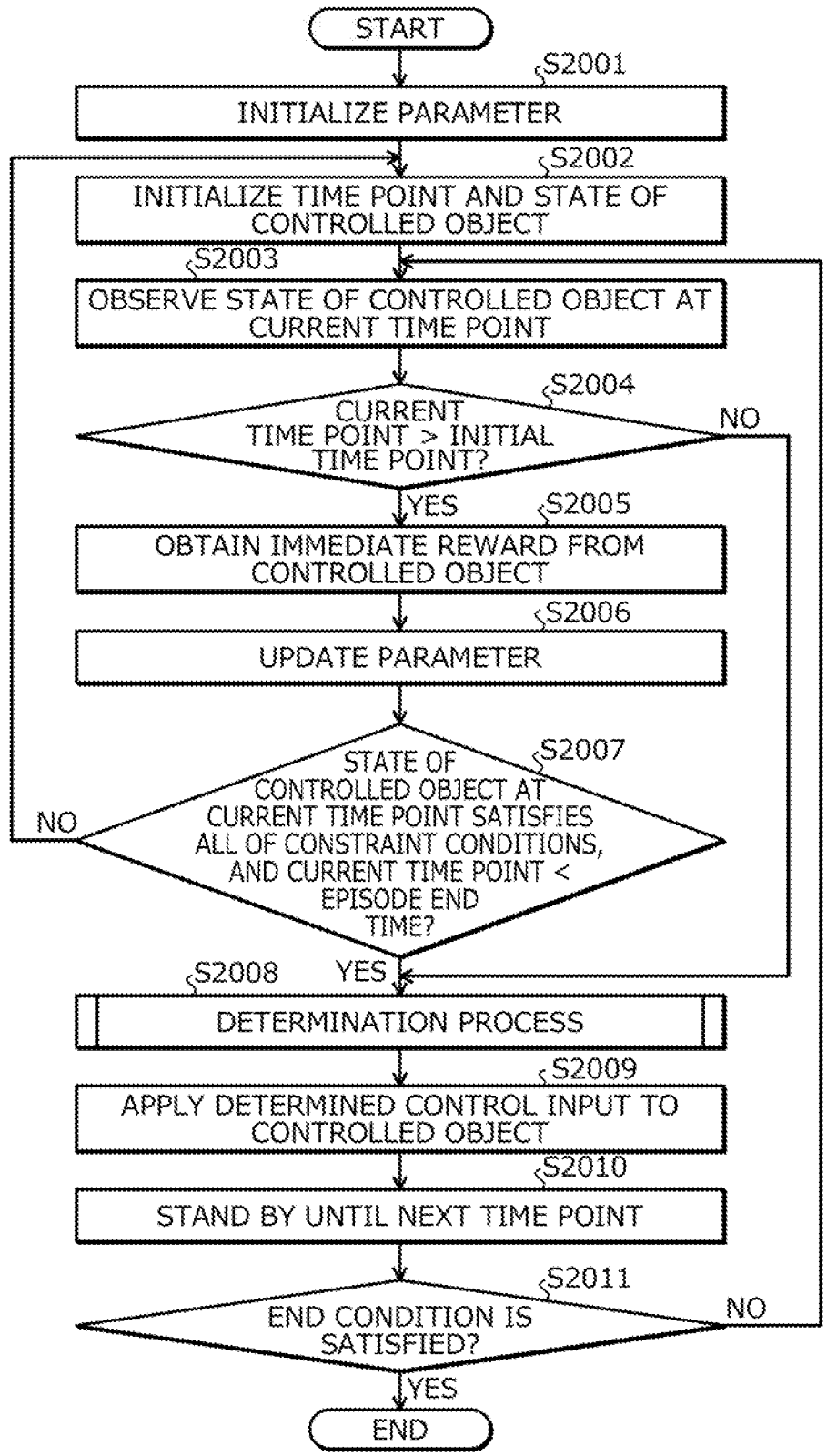

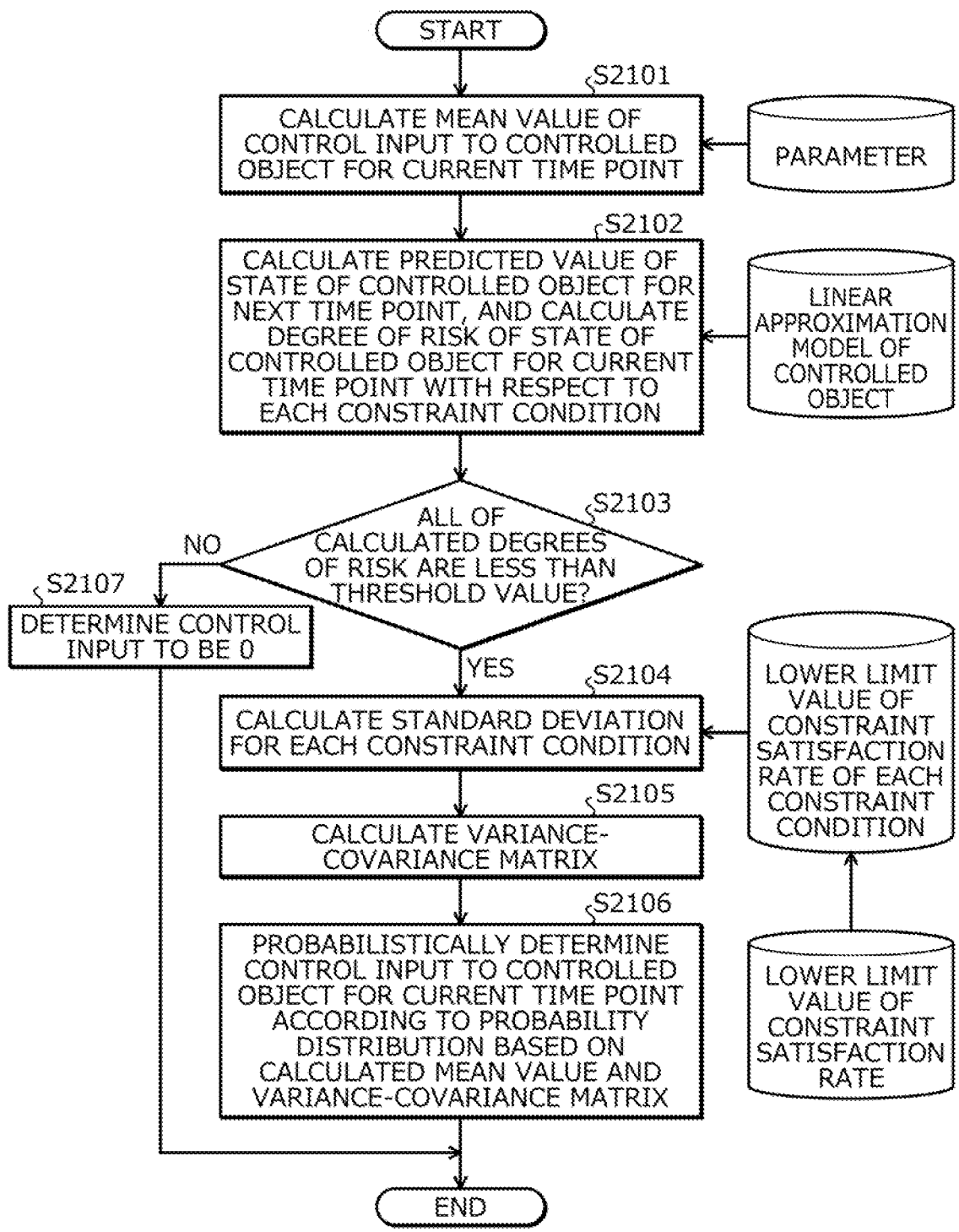

REINFORCEMENT LEARNING METHOD, RECORDING MEDIUM, AND REINFORCEMENT LEARNING SYSTEM

CROSS REFERENCE TO RELATED APPLICATIONS

This application is based upon and claims the benefit of priority of the prior Japanese Patent Application No. 2019-039032, filed on Mar. 4, 2019, the entire contents of which are incorporated herein by reference.

FIELD

The embodiments discussed herein related to a reinforcement learning method, a recording medium, and a reinforcement learning system.

BACKGROUND

Conventionally, in a technique of reinforcement learning, a policy for optimizing a value function defining a value of a control input to a controlled object is learned based on a cumulative cost or a cumulative reward from the controlled object by referring to an immediate cost or an immediate reward from the controlled object corresponding to the control input to the controlled object. The value function is a state action value function (Q function) or a state value function (V function), etc.

In a conventional technique, for example, a method of generating a control signal applied to a plant is autonomously learned so that a cost evaluation value obtained by evaluating a plant operation cost is optimized. In another technique, for example, a search range of a control parameter is determined based on knowledge information in which an amount of change of the control parameter used for calculating an operation signal is correlated with an amount of change of a state of a plant. In another technique, for example, a correction signal for an operation signal is generated when a second error defined as an error from a target value of a second measurement signal of a plant is larger than a first error defined as an error from a target value of a first measurement signal of the plant. For examples of such techniques, refer to Japanese Laid-Open Patent Publication No. 2012-53505, Japanese Laid-Open Patent Publication No. 2017-157112, and Japanese Laid-Open Patent Publication No. 2009-128972.

SUMMARY

According to an embodiment of the invention, a reinforcement learning method executed by a computer, includes calculating a degree of risk for a state of a controlled object at a current time point with respect to a constraint condition related to the state of the controlled object, the degree of risk being calculated based on a predicted value of the state of the controlled object at a future time point, the predicted value being obtained from model information defining a relationship between the state of the controlled object and a control input to the controlled object; and determining the control input to the controlled object at the current time point, from a range defined according to the calculated degree of risk so that the range becomes narrower as the calculated degree of risk increases.

An object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 19 is an explanatory diagram depicting effects obtained by the information processing apparatus 100 in operation example 2.
FIG. 20 is a flowchart depicting an example of the overall process procedure in operation example 2.
FIG. 21 is a flowchart depicting an example of the determination process procedure in operation example 2.

DESCRIPTION OF THE INVENTION

First, problems associated with the conventional techniques will be discussed. In the conventional techniques, a probability of the state of the controlled object violating a constraint condition related to the state of the controlled object may increase during learning of a policy through reinforcement learning. If the state of the controlled object violates the constraint condition related to the state of the controlled object, the controlled object may be adversely affected.

Embodiments of a reinforcement learning method, a reinforcement learning program, and a reinforcement learning system will be described in detail with reference to the accompanying drawings.

Figure 1:
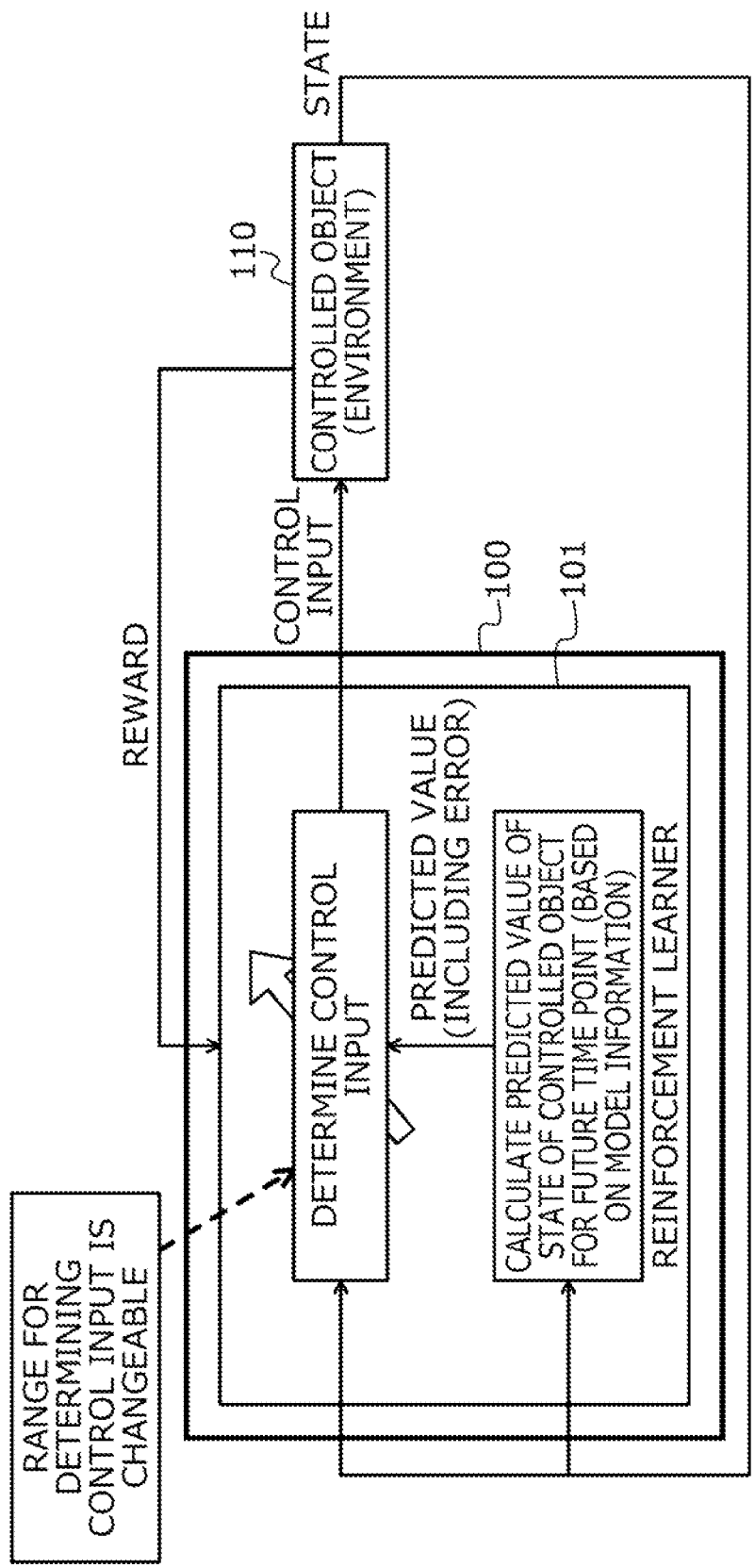
FIG. 1 is an explanatory diagram of an example of a reinforcement learning method according to an embodiment.
Figure 2:
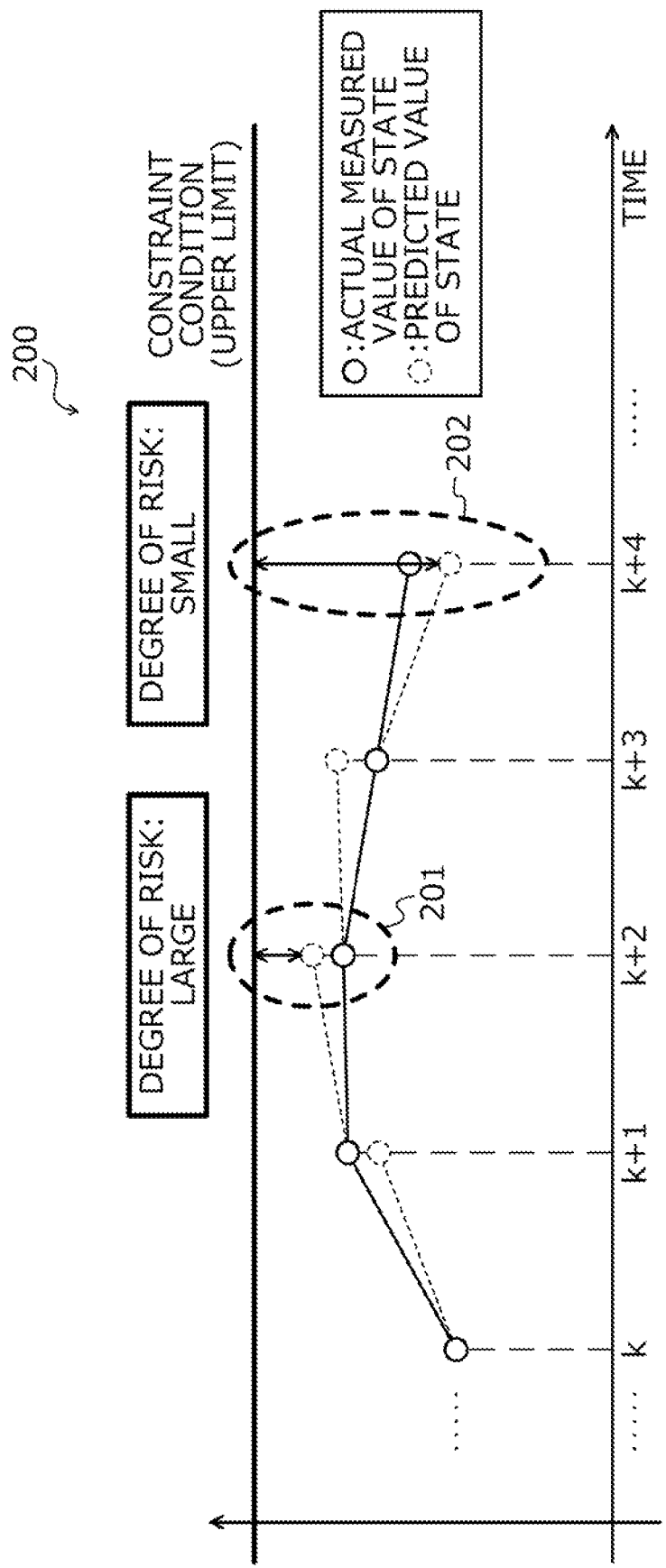
FIG. 2 is an explanatory diagram of an example of the reinforcement learning method according to an embodiment.
Figure 3:
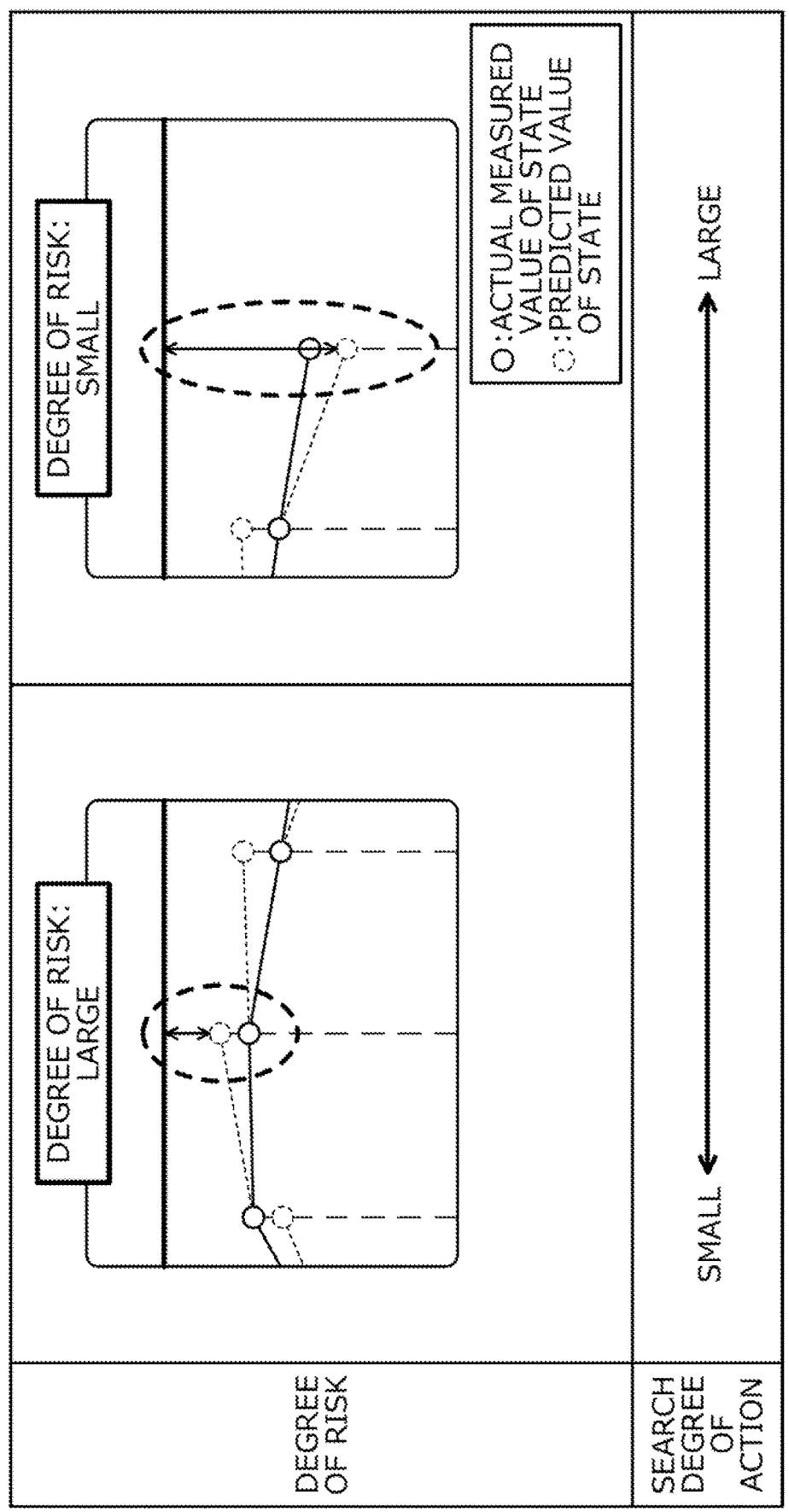
FIG. 3 is an explanatory diagram of an example of the reinforcement learning method according to an embodiment.

FIGS. 1, 2, and 3 are explanatory diagrams of an example of a reinforcement learning method according to an embodiment. An information processing apparatus 100 is a computer for controlling a controlled object 110 by reinforcement learning. The information processing apparatus 100 is a server, a personal computer (PC), or a microcontroller, for example.

The controlled object is some sort of event/matter, for example, an actually existing physical system. The controlled object is also referred to as an environment. For example, the controlled object 110 may exist on a simulator. For example, the controlled object is an automobile, an autonomous mobile robot, an industrial robot, a drone, a helicopter, a server room, a power-generating facility, a chemical plant, or a game.

Reinforcement learning is a technique of learning a policy for controlling the controlled object 110. The policy is a control law for determining a control input to the controlled object 110. The control input is also referred to as an action. In the reinforcement learning, for example, a control input to the controlled object 110 is determined, and a policy for optimizing a value function is learned by referring to a state of the controlled object 110, the determined control input, and an immediate cost or an immediate reward from the controlled object 110 observed according to the determined control input.

The value function is a function defining a value of the control input to the controlled object 110, based on a cumulative cost or a cumulative reward from the controlled object 110. The value function is a state action value function (Q function) or a state value function (V function), for example. The value function is expressed by using a state basis function, for example. The optimization corresponds to minimization related to a value function that is based on the cumulative cost and corresponds to maximization related to a value function that is based on the cumulative reward. The reinforcement learning may be implemented even when a property of the controlled object 110 is unknown, for example. For the reinforcement learning, for example, Q learning, SARSA, or actor-critic is utilized.

If a constraint condition exists for the state of the controlled object 110, it is desirable to learn a policy enabling control of the controlled object 110 while satisfying the constraint condition, and additionally, the constraint condition is desirably satisfied even during learning of the policy through the reinforcement learning. Particularly, if the reinforcement learning is applied to the controlled object 110 that actually exists rather than on a simulator, the violation against the constraint condition may adversely affect the controlled object 110 that actually exists. Therefore, the constraint condition is desirably satisfied even during learning of the policy through the reinforcement learning. The violation means that the constraint condition is not satisfied.

For example, when the controlled object 110 is a server room and the constraint condition is to make a temperature of the server room equal to or less than a certain level, a violation of the constraint condition may make a server in the server room vulnerable to failure. For example, when the controlled object 110 is a windmill and the constraint condition is to keep the rotation speed of the windmill equal to or less than a certain level, a violation of the constraint condition may make the windmill vulnerable to damage. As described above, when the constraint condition is violated, the actual controlled object 110 may be adversely affected.

However, the conventional reinforcement learning does not consider whether the state of the controlled object 110 satisfies the constraint condition when the control input to the controlled object 110 is determined during learning of the policy. Therefore, the probability that the state of the controlled object 110 violates the constraint condition increases during learning of the policy. Additionally, the learned policy may not be a policy that enables the control of the controlled object 110 in a manner satisfying the constraint condition. For conventional reinforcement learning, for example, see Japanese Laid-Open Patent Publication No. 2009-128972 and Doya, Kenji, "Reinforcement learning in continuous time and space," Neural Computation 12.1 (2000): 219-245.

In this regard, an improved technique of giving a penalty in the case of violation of the constraint condition in the conventional reinforcement learning described above is conceivable. This improved method enables learning of a policy that enables the control of the controlled object 110 in a manner that satisfies the constraint condition; however, the constraint condition cannot be satisfied during learning of the policy through the reinforcement learning.

On the other hand, even when the constraint condition can be satisfied during learning of the policy through the reinforcement learning, it is undesirable to cause deterioration of learning efficiency. For example, although it is conceivable that a range for determining a control input is fixed to a relatively narrow range during learning of the policy through the reinforcement learning, this may cause a deterioration of learning efficiency and is undesirable from the viewpoint of learning efficiency.

In another conceivable technique, the controlled object is accurately modeled through a preliminary experiment and the range for determining the control input is adjusted by using the accurate model of the controlled object so as to reduce the probability of violation of the constraint condition. This technique cannot be applied when accurate modeling is difficult. Additionally, when the accurate model of the controlled object is a complex model, this method leads to an increase in calculation load related to the reinforcement learning. For this method, for example, see Summers, Tyler, et al, "Stochastic optimal power flow based on conditional value at risk and distributional robustness," International Journal of Electrical Power & Energy Systems 72 (2015): 116-125.

Therefore, in this embodiment, description will be made of a reinforcement learning method in which the control input to the controlled object 110 is determined from a range defined according to a degree of risk of the state of the controlled object 110 at the current time point with respect to the constraint condition, which is calculated from the state of the controlled object 110 at a future time point. This reinforcement learning method may improve the probability of satisfaction of the constraint condition during learning of the policy through the reinforcement learning.

As depicted in FIG. 1, the information processing apparatus 100 performs the reinforcement learning by repeating a series of processes of outputting the control input to the controlled object 110, observing the state of the controlled object 110 and an immediate reward from the controlled object 110, and updating the policy, by using the reinforcement learning apparatus 101. For example, in the reinforcement learning, the information processing apparatus 100 refers to model information to calculate a predicted value of the state of the controlled object 110 at a future time point and determines and outputs the control input to the controlled object 110 based on the calculated predicted value of the state of the controlled object 110 at a future time point.

The model information is information defining a relationship between the state of the controlled object 110 and the control input to the controlled object 110. For example, the model information is information defining a function outputting the state of the controlled object 110 for a second time point subsequent to a first time point when the state of the controlled object 110 at the first time point and the control input to the controlled object 110 at the first time point are input. A technique of the information processing apparatus 100 determining the control input to the controlled object 110 will be described with reference to FIGS. 2 and 3.

As depicted in FIG. 2, when determining the control input to the controlled object 110, the information processing apparatus 100 calculates the degree of risk of the state of the controlled object 110 at the current time point with respect to the constraint condition, based on the predicted value of the state of the controlled object 110 at a future time point. The constraint condition relates to the state of the controlled object 110. For example, the degree of risk indicates how likely it is that the state of the controlled object 110 at the current time point results in a situation where the state of the controlled object 110 at a future time point violates the constraint condition.

In the example of FIG. 2, description will be made of a case in which an upper limit related to the state of the controlled object 110 is set as the constraint condition. In this case, the information processing apparatus 100 calculates the degree of risk of the state of the controlled object 110 at the current time point such that the degree of risk increases as the predicted value of the state of the controlled object 110 at a future time point approaches the upper limit within a range equal to or less than the upper limit. A graph 200 of FIG. 2 indicates a predicted value and an actual measured value of the state at each time point. For example, the degree of risk is calculated as a relatively large value at a time point k+1 since the predicted value of the state at a future time point k+2 is relatively close to the upper limit. For example, the degree of risk is calculated as a relatively small value at a time point k+3 since the predicted value of the state at a future time point k+4 is relatively far from the upper limit.

This enables the information processing apparatus 100 to obtain an index for determining a range for determining the control input to the controlled object 110. For example, at the time point k+1, the degree of risk is relatively large and acts as an index indicative of a relatively narrow range 201 in which the state at the future time point k+2 does not violate the constraint condition. For example, at the time point k+3, the degree of risk is relatively small and acts as an index indicative of a relatively wide range 202 in which the state at the future time point k+4 does not violate the constraint condition. FIG. 3 will then be described.

As depicted in FIG. 3, the information processing apparatus 100 determines the control input to the controlled object 110 at the current time point, from a range defined according to the calculated degree of risk. As described above, a larger degree of risk indicates a narrower range in which the state of the controlled object 110 at a future time point does not violate the constraint condition. In other words, when the degree of risk is larger, the probability of the state of the controlled object 110 violating the constraint condition at a future time point tends to increase if the range for determining the control input to the controlled object 110 is expanded. Therefore, for example, the information processing apparatus 100 determines the control input to the controlled object 110 at the current time point, from the range defined according to the calculated degree of risk such that the range becomes narrower when the calculated degree of risk is larger.

As a result, when the calculated degree of risk is larger, the information processing apparatus 100 may narrow the range for determining the control input to the controlled object 110 so as to suppress an increase in the probability of the state of the controlled object 110 violating the constraint condition at a future time point. As a result, the information processing apparatus 100 may suppress an increase in the probability of the state of the controlled object 110 violating the constraint condition during learning of the policy through the reinforcement learning. On the other hand, when the calculated degree of risk is smaller, the information processing apparatus 100 may expand the range for determining the control input to the controlled object 110 so as to suppress a reduction in learning efficiency of learning of the policy through the reinforcement learning.

In this case, it may be desirable to make an evaluation possible before start of the reinforcement learning, in terms of a level to which the probability of the state of the controlled object 110 violating the constraint condition may be reduced during learning of the policy through the reinforcement learning. For example, if the reinforcement learning is applied to the controlled object 110 the actually exists, a violation of the constraint condition may adversely affect the actually existing controlled object 110. It is, therefore, desirable to make an evaluation possible before start of the reinforcement learning, in terms of a level to which the probability of the state of the controlled object 110 violating the constraint condition may be reduced during learning of the policy through the reinforcement learning.

In this regard, the information processing apparatus 100 may determine the control input to the controlled object 110 so as to assure that the probability of the state of the controlled object 110 satisfying the constraint condition becomes equal to or greater than a certain level during learning of the policy through the reinforcement learning. For example, during learning of the policy through episode-type reinforcement learning, the information processing apparatus 100 may assure that the probability of the state of the controlled object 110 satisfying the constraint condition becomes equal to or greater than a preset lower limit value at all time points in an episode. In the episode-type reinforcement learning, the episode is defined as a period from initialization of the state of the controlled object 110 until the state of the controlled object 110 no longer satisfies the constraint condition, or a period from initialization of the state of the controlled object 110 until a certain time elapses. The episode is a unit of learning. Operation example 1 will be described later in detail with reference to FIGS. 6 to 8 as a case of enabling assurance that the probability of the state of the controlled object 110 satisfying the constraint condition becomes equal to or greater than a certain level.

Although the one constraint condition is set in this description, the present invention is not limited hereto. For example, multiple constraint conditions may be set. In this case, the information processing apparatus 100 increases the probability of the state of the controlled object 110 simultaneously satisfying the multiple constraint conditions during learning of the policy through the reinforcement learning. Operation example 2 will be described later in detail with reference to FIGS. 16 and 17 as the case of setting multiple constraint conditions.

Although the information processing apparatus 100 refers to the model information to calculate the predicted value of the state of the controlled object 110 for a future time point, the present invention is not limited hereto. For example, an apparatus other than the information processing apparatus 100 may calculate the predicted value of the state of the controlled object 110 for a future time point. In this case, the information processing apparatus 100 obtains the predicted value of the state of the controlled object 110 for a future time point, from the apparatus calculating the predicted value of the state of the controlled object 110 at a future time point.

A hardware configuration example of the information processing apparatus 100 depicted in FIGS. 1 to 3 will be described with reference to FIG. 4.

Figure 4:
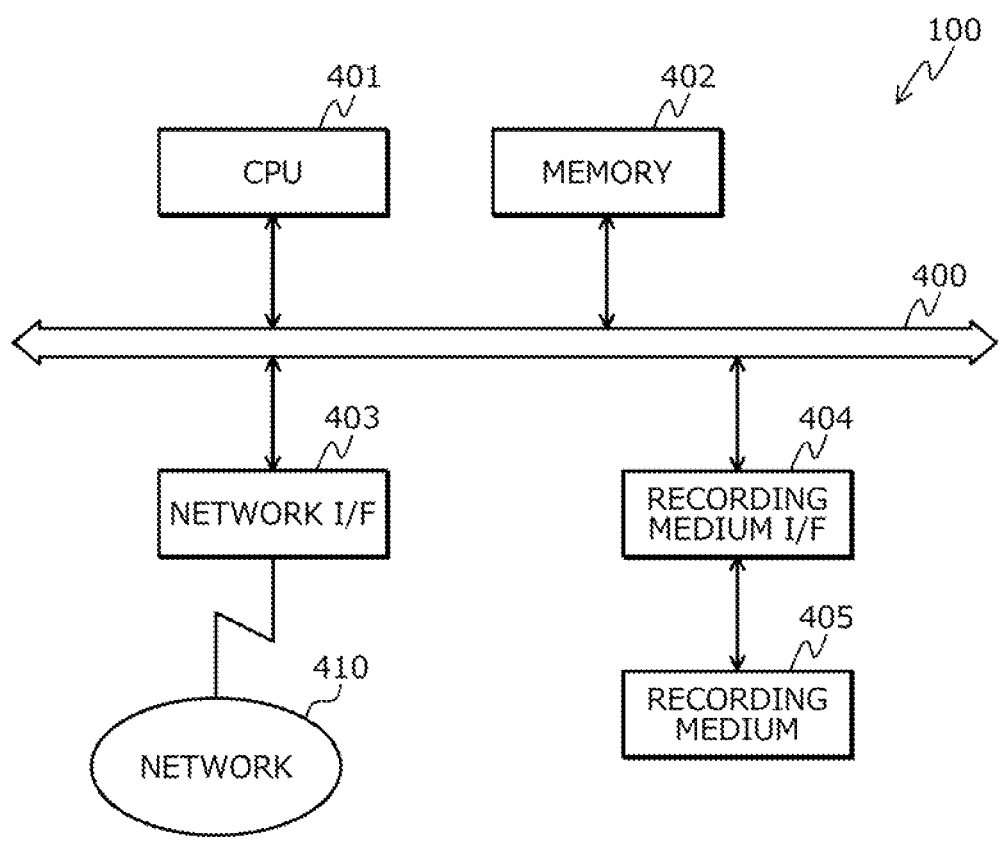
FIG. 4 is a block diagram depicting a hardware configuration example of an information processing apparatus 100.

FIG. 4 is a block diagram depicting a hardware configuration example of the information processing apparatus 100. In FIG. 4, the information processing apparatus 100 includes a central processing unit (CPU) 401, a memory 402, a network interface (I/F) 403, a recording medium I/F 404, and a recording medium 405. The constituent units are connected to each other through a bus 400.

The CPU 401 is responsible for the overall control of the information processing apparatus 100. The memory 402 includes a read only memory (ROM), a random access memory (RAM), and a flash ROM, for example. For example, the flash ROM and the ROM store various programs and the RAM is used as a work area of the CPU 401. The programs stored in the memory 402 are loaded to the CPU 401 so that coded processes are executed by the CPU 401.

The network I/F 403 is connected to a network 410 through a communication line and is connected to another computer via the network 410. The network I/F 403 is responsible for an internal interface with the network 410 and controls input/output of data from the other computer. The network I/F 403 is a modem or a local area network (LAN) adapter, for example.

The recording medium I/F 404 controls the reading and writing of data to the recording medium 405 under the control of the CPU 401. The recording medium I/F 404 is a disk drive, a solid-state drive (SSD), or a universal serial bus (USB) port, for example. The recording medium 405 is a nonvolatile memory storing data written thereto under the control of the recording medium I/F 404. The recording medium 405 is a disk, a semiconductor memory, or a USB memory, for example. The recording medium 405 may be detachable from the information processing apparatus 100.

In addition to the constituent units described above, for example, the information processing apparatus 100 may include a keyboard, a mouse, a display, a printer, a scanner, a microphone, and a speaker. The information processing apparatus 100 may include multiple recording medium I/Fs 404 and recording media 405. Alternatively, the information processing apparatus 100 may not include the recording medium I/F 404 and the recording medium 405.

A functional configuration example of the information processing apparatus 100 will be described with reference to FIG. 5.

Figure 5:
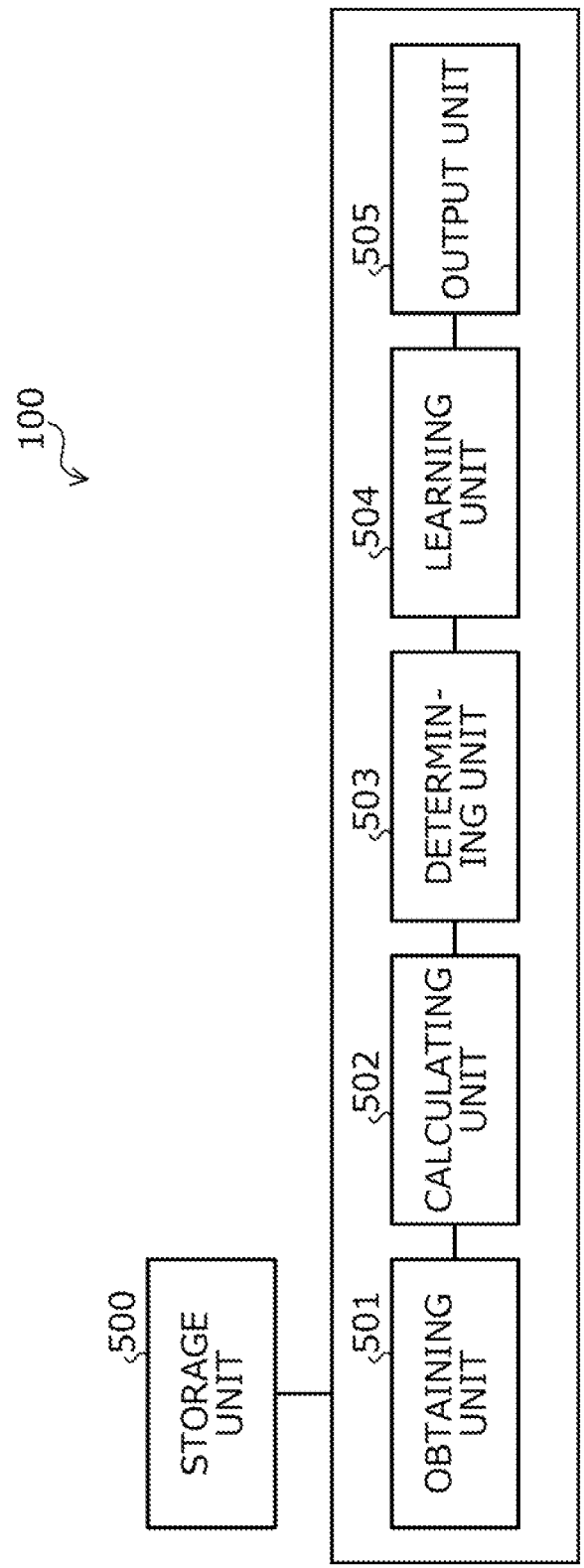
FIG. 5 is a block diagram depicting a functional configuration example of the information processing apparatus 100.

FIG. 5 is a block diagram depicting a functional configuration example of the information processing apparatus 100. The information processing apparatus 100 includes a storage unit 500, an obtaining unit 501, a calculating unit 502, a determining unit 503, a learning unit 504, and an output unit 505.

For example, the storage unit 500 is implemented by storage areas of the memory 402, the recording medium 405, etc. depicted in FIG. 4. Although the storage unit 500 is included in the information processing apparatus 100 in the following description, the present invention is not limited hereto. For example, the storage unit 500 may be included in an apparatus different from the information processing apparatus 100 so that storage contents of the storage unit 500 may be referred to by the information processing apparatus 100.

The obtaining unit 501 to the output unit 505 function as an example of a control unit. For example, functions of the obtaining unit 501 to the output unit 505 are implemented by the CPU 401 executing programs stored in the storage areas of the memory 402, the recording medium 405, etc. depicted in FIG. 4, or by the network I/F 403. The process results of the functional units are stored to the storage areas of the memory 402, the recording medium 405, etc. depicted in FIG. 4, for example.

The storage unit 500 is referred to in the processes of the functional units or stores various types of information to be updated. The storage unit 500 accumulates the state of the controlled object 110, the control input to the controlled object 110, and the immediate cost or the immediate reward from the controlled object 110. As a result, the storage unit 500 may enable the functional units to refer to the state of the controlled object 110, the control input to the controlled object 110, and the immediate cost or the immediate reward from the controlled object 110.

For example, the controlled object 110 may be a power generation facility. The power generation facility is, for example, a wind power generation facility. In this case, the control input is, for example, torque of a generator of the power generation facility. The state is, for example, at least one of a power generation amount of the power generation facility, a rotation amount of a turbine of the power generation facility, a rotation speed of the turbine of the power generation facility, a wind direction with respect to the power generation facility, and a wind speed with respect to the power generation facility. The reward is, for example, a power generation amount of the power generation facility. The power generation facility is, for example, a thermal power generation facility, a solar power generation facility, or a nuclear power generation facility.

For example, the controlled object 110 may be an industrial robot. In this case, the control input is, for example, a torque of a motor of the industrial robot. The state is, for example, at least one of an image taken by the industrial robot, a joint position of the industrial robot, a joint angle of the industrial robot, and a joint angular speed of the industrial robot. The reward is, for example, a production amount of products of the industrial robot. The production amount is, for example, an assembly count. The assembly count is, for example, the number of products assembled by the industrial robot.

For example, the controlled object may be air conditioning equipment. For example, the air conditioning equipment is in a server room. In this case, the control input is, for example, at least one of a set temperature of the air conditioning equipment and a set air volume of the air conditioning equipment. The state is, for example, at least one of an actual temperature inside a room that has the air conditioning equipment, an actual temperature outside the room that has the air conditioning equipment, and weather. The cost is, for example, power consumption of the air conditioning equipment.

The storage unit 500 stores model information. The model information defines a relationship between the state of the controlled object 110 and the control input to the controlled object 110. For example, the model information uses a variable indicative of the state of the controlled object 110 at the first time point and a variable indicative of the control input to the controlled object 110 at the first time point to represent linear approximation of a function of the state of the controlled object 110 at a second time point subsequent to the first time point. For example, the second time point is a time point after a unit time from the first time point.

The storage unit 500 stores a value function. For example, the value function defines a value of the control input to the controlled object 110 based on the cumulative cost or the cumulative reward from the controlled object 110. For example, the value function is represented by using a state basis function. The value function is a state action value function (Q function) or a state value function (V function), etc. The storage unit 500 stores a parameter of the value function, for example. As a result, the storage unit 500 may enable the functional units to refer to the value function.

The storage unit 500 stores a policy for controlling the controlled object 110. For example, the policy is a control law for determining a control input to the controlled object 110. For example, the storage unit 500 stores a parameter w of the policy. As a result, the storage unit 500 may make the control input to the controlled object 110 decidable by the policy. The storage unit 500 stores one or multiple control conditions related to the state of the controlled object 110. As a result, the storage unit 500 may enable the functional units to refer to the control conditions. In the description hereinafter, a case in which the storage unit 500 accumulates immediate reward will be described as an example.

The obtaining unit 501 obtains various types of information used for the processes of the functional units. The obtaining unit 501 stores the obtained various types of information in the storage unit 500 or outputs to the functional units. The obtaining unit 501 may output the various types of information stored in the storage unit 500 to the functional units. The obtaining unit 501 obtains various types of information based on a user's operation input, for example. The obtaining unit 501 may receive various types of information from an apparatus different from the information processing apparatus 100, for example.

The obtaining unit 501 obtains the state of the controlled object 110 and the immediate reward from the controlled object 110 corresponding to the control input to the controlled object 110. For example, the obtaining unit 501 obtains the state of the controlled object 110 and the immediate reward from the controlled object 110 corresponding to the control input to the controlled object 110 and outputs the state and the immediate reward to the storage unit 500. As a result, the obtaining unit 501 may cause the storage unit 500 to accumulate the state of the controlled object 110 and the immediate reward from the controlled object 110 corresponding to the control input to the controlled object 110.

In the reinforcement learning, the calculation unit 502 refers to the model information for each time point to calculate a predicted value of the state of the controlled object 110 for a future time point. The time point is a unit time interval. The future time point is a time point after a unit time from a current time point. The reinforcement learning is of the episode type, for example. In the episode type, a unit of learning is defined as a period from initialization of the state of the controlled object 110 until the state of the controlled object 110 no longer satisfies the constraint condition, or a period from initialization of the state of the controlled object 110 until a certain time elapses.

For example, the calculating unit 502 obtains the predicted value of the state of the controlled object 110 for a future time point based on the model information and an upper limit of an error included in the predicted value of the state of the controlled object 110 at a future time point. The upper limit of the error is set in advance by a user. As a result, the calculating unit 502 may calculate a degree of risk of the state of the controlled object 110 at the current time point with respect to the constraint condition related to the state of the controlled object 110.

In the reinforcement learning, the calculating unit 502 calculates, for each time point, the degree of risk of the state of the controlled object 110 at the current time point with respect to the constraint condition related to the state of the controlled object 110, based on the predicted value of the state of the controlled object 110 at a future time point. For example, the degree of risk indicates how likely it is that the state of the controlled object 110 at the current time point results in a situation where the state of the controlled object 110 at a future time point violates the constraint condition.

Based on the predicted value of the state of the controlled object 110 at a future time point, the calculating unit 502 calculates a degree of risk of the state of the controlled object 110 at the current time point with respect to each of the multiple constraint conditions related to the state of the controlled object 110. As a result, the calculating unit 502 may enable the determining unit 503 to refer to the degree of risk used as an index for defining a range for determining the control input to the controlled object 110.

In the reinforcement learning, for example, the determining unit 503 determines, for each time point, the control input to the controlled object 110 at the current time. For example, the determining unit 503 determines the control input to the controlled object 110 at the current time point from a range defined according to the calculated degree of risk. For example, when the calculated degree of risk is smaller, the defined range becomes wider. As a result, when the calculated degree of risk is larger, the determining unit 503 may narrow the range for determining the control input to the controlled object 110 so as to suppress an increase in the probability of the state of the controlled object 110 violating the constraint condition at a future time point.

For example, when one constraint condition exists, and the calculated degree of risk is equal to or greater than a threshold value, the determining unit 503 determines a predetermined value as the control input to the controlled object 110. The controlled object 110 may have a property assuring that when the state of the controlled object 110 at the first time point satisfies the constraint condition and the control input to the controlled object 110 at the first time point is 0, the state of the controlled object 110 at the second time point satisfies the constraint condition. The second time point is a time point subsequent to the first time point. For example, the second time point is a time point after a unit time from the first time point. Therefore, the determining unit 503 may use 0 as a predetermined value. The determining unit 503 may determine the control input to the controlled object 110 to be any predetermined value among multiple predetermined values. As a result, the determining unit 503 may prevent violation of the constraint condition by the state of the controlled object 110 at a future time point.

For example, when one constraint condition exists and the calculated degree of risk is less than the threshold value, the determination unit 503 probabilistically determines the control input to the controlled object 110 for the current time point under the probabilistic evaluation index related to satisfaction of the constraint condition. The evaluation index is preset by the user, for example. For example, the evaluation index indicates a lower limit of the probability that the state of the controlled object 110 satisfies the constraint condition during learning of the policy through the reinforcement learning. For example, when the lower limit of the probability is 90%, the evaluation index is 0.9.

For example, when the calculated degree of risk is less than the threshold value, the determining unit 503 calculates a mean value possible for the control input to the controlled object 110 at the current time point and calculates the variance-covariance matrix under the evaluation index. For example, the determining unit 503 then uses the calculated mean value and the variance-covariance matrix to probabilistically determine the control input to the controlled object 110 at the current time point. In particular, the determining unit 503 probabilistically determines the control input to the controlled object 110 for the current time point as described later in operation example 1 with reference to FIGS. 6 to 8. As a result, the determining unit 503 may make the probability of the state of the controlled object 110 satisfying the constraint condition at a future time point equal to or greater than the probability based on the evaluation index.

For example, when the multiple constraint conditions exist and the degree of risk calculated for any one of the multiple constraint conditions is equal to or greater than the threshold value, the determining unit 503 determines a predetermined value as the control input to the controlled object 110. The determining unit 503 may use 0 as the predetermined value. As a result, the determining unit 503 may prevent the state of the controlled object 110 at a future time point from violating the constraint condition.

For example, when the multiple constraint conditions exist, and the degrees of risk calculated for the respective constraint conditions are less than the threshold value, the determining unit 503 probabilistically determines the control input to the controlled object 110 for the current time point under the probabilistic evaluation index for simultaneously satisfying the multiple constraint conditions. For example, when the multiple constraint conditions exist, the determining unit 503 probabilistically determines the control input to the controlled object 110 for the current time point as described later in operation example 2 with reference to FIGS. 16 and 17. As a result, the determining unit 503 may make the probability of the state of the controlled object 110 satisfying the constraint condition at a future time point equal to or greater than the probability based on the evaluation index.

The learning unit 504 learns the policy. The learning unit 504 updates the policy based on the determined control input to the controlled object 110, the obtained state of the controlled object 110 and immediate reward from the controlled object 110. For example, the learning unit 504 updates a parameter of the policy. As a result, the learning unit 504 may learn the policy capable of controlling the controlled object 110 so that the constraint condition is satisfied.

The output unit 505 outputs to the controlled object 110, the control input determined by the determining unit 503. For example, the control input is a command value for the controlled object 110. For example, the output unit 505 outputs the command value for the controlled object 110 to the controlled object 110. As a result, the output unit 505 may control the controlled object 110.

The output unit 505 may output a process result of any of the functional units. A format of the output is, for example, display on a display, print output to a printer, transmission to an external apparatus via the network I/F 403, or storage to the storage areas of the memory 402, the recording medium 405, etc. As a result, the output unit 505 may notify the user of the process result of any of the functional units.

Operation example 1 of the information processing apparatus 100 will be described with reference to FIGS. 6 to 8.

Figure 6:
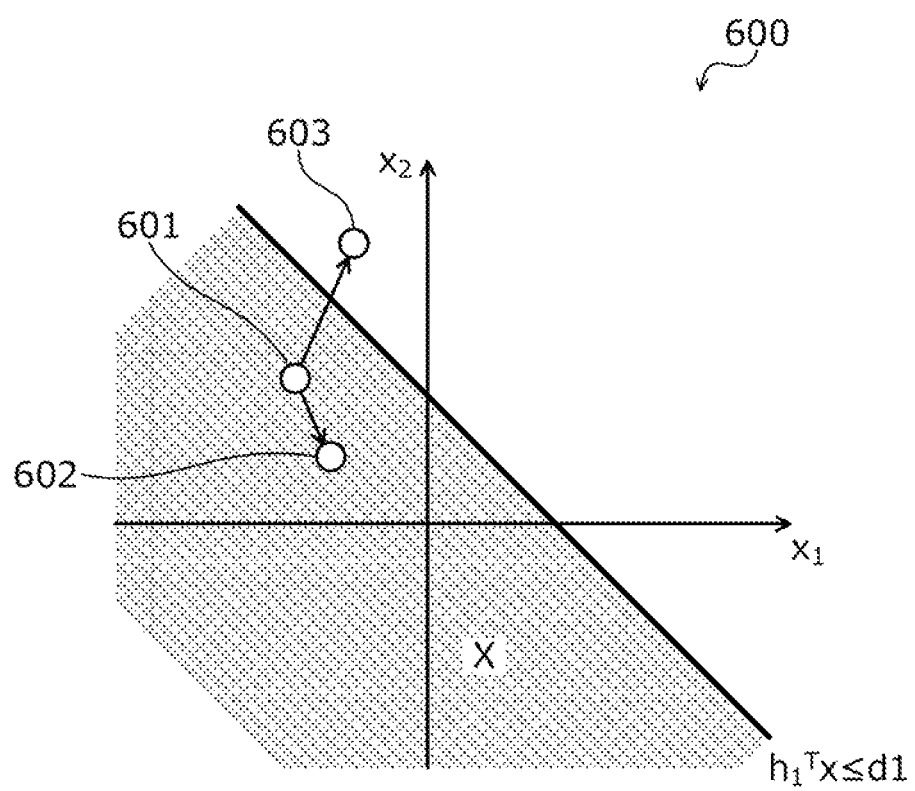
FIG. 6 is an explanatory diagram depicting operation example 1 of the information processing apparatus 100.
Figure 7:
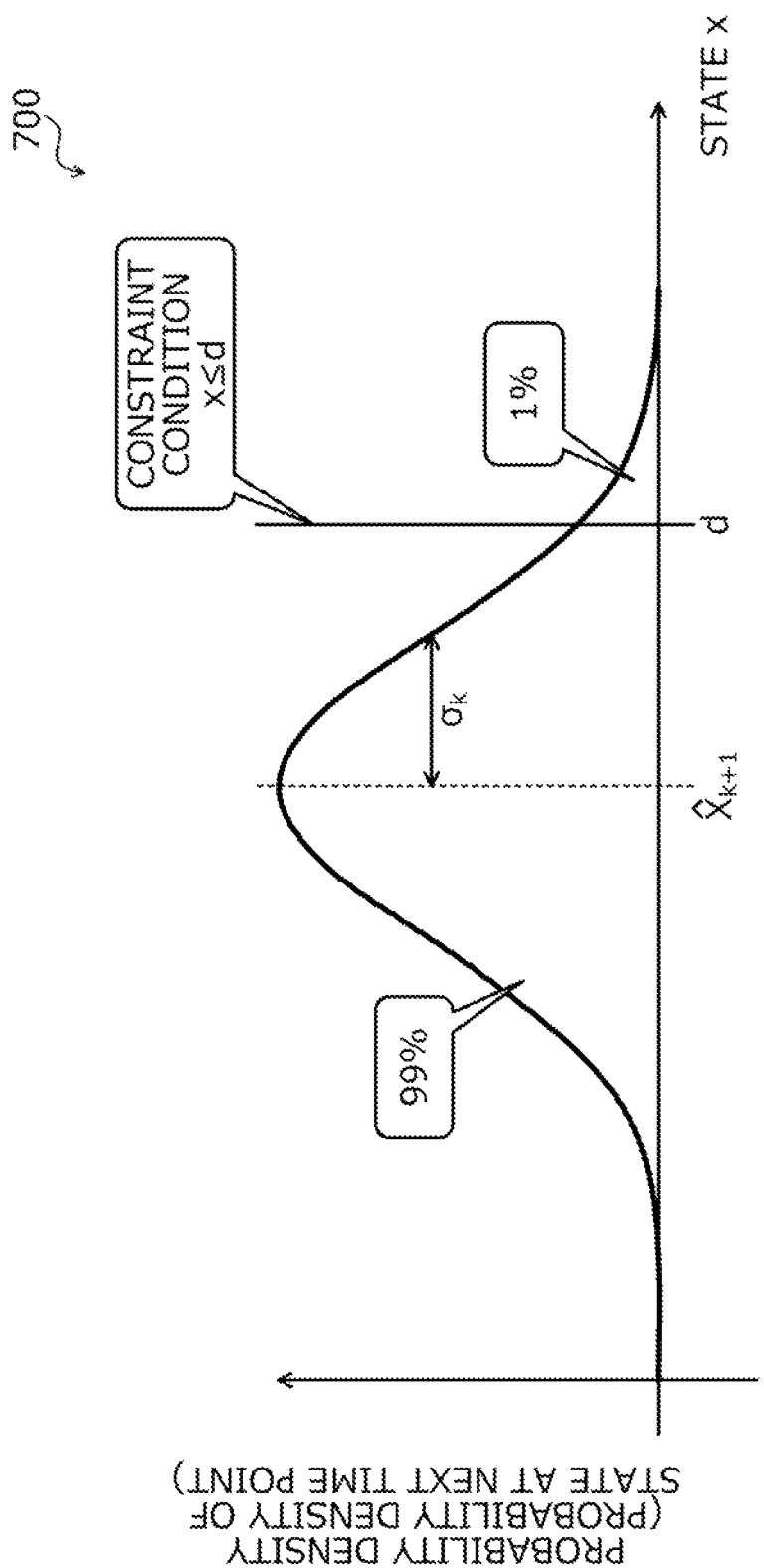
FIG. 7 is an explanatory diagram depicting operation example 1 of the information processing apparatus 100.
Figure 8:
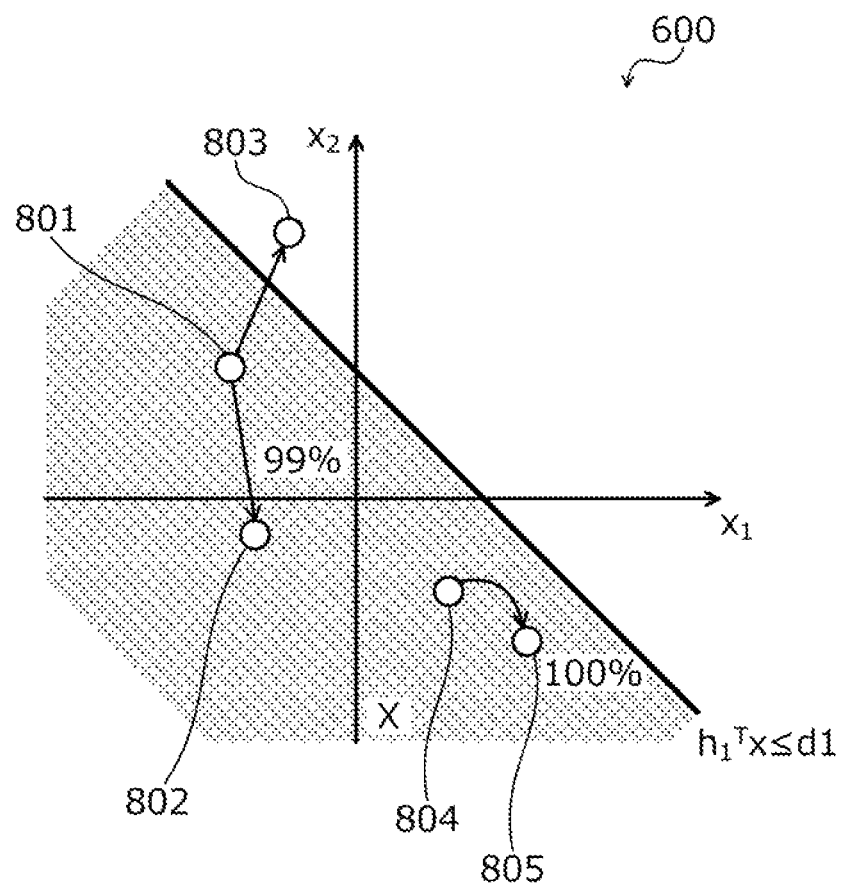
FIG. 8 is an explanatory diagram depicting operation example 1 of the information processing apparatus 100.

FIGS. 6, 7, and 8 are explanatory diagrams depicting operation example 1 of the information processing apparatus 100. Operation example 1 corresponds to a case of the information processing apparatus 100 assuring that the probability of the state of the controlled object 110 satisfying the constraint condition becomes equal to or greater than a certain level during learning of the policy through the continuous type reinforcement learning. In the following description, a flow of operations of the Information processing apparatus 100 will first be described, examples of operations of the reinforcement learner 101 will be described with mathematical expressions, and specific examples of the operations of the information processing apparatus 100 will be described with actual examples.

Regarding the reinforcement learning and the controlled object 110, the following three characteristics are assumed. A first characteristic is a property that the reinforcement learning uses a policy of probabilistically determining the control input and may change the variance-covariance matrix of the probability density function used for determining the control input at any timing.

A second characteristic is a property that since the controlled object 110 is linear with respect to the control input and the constraint condition is linear with respect to the state, the variance of the control input at the first time point is stored for the state of the controlled object 110 at the second time point subsequent to the first time point. A third characteristic is a property that when the control input is 0, no shift is made from a state satisfying the constraint condition to a state not satisfying the constraint condition.

The information processing apparatus 100 uses the characteristics to perform the reinforcement learning. For example, the information processing apparatus 100 determines whether the degree of risk calculated for the current state is at least equal to a threshold value at each time point of the reinforcement learning. When the degree of risk is equal to or greater than the threshold value, the information processing apparatus 100 determines that the control input is 0. On the other hand, when the calculated degree of risk is less than the threshold value, the information processing apparatus 100 calculates a variance-covariance matrix, based on the degree of risk under a probabilistic evaluation index preset by the user and probabilistically determines the control input based on the variance-covariance matrix.

For example, the evaluation index indicates a lower limit value of the probability of satisfaction of the constraint condition. In the following description, the probability of satisfaction of the constraint condition may be referred to as "constraint satisfaction rate". For example, in the reinforcement learning, the information processing apparatus 100 determines and applies the control input to the controlled object 110 while adjusting the range for determining the control input according to the following steps 1 to 7.

For step 1, the information processing apparatus 100 calculates a mean value of the control input corresponding to the state at the current time point. For example, the mean value is a center value. For step 2, the information processing apparatus 100 predicts the state for the next time point based on the linear approximation model information, the mean value of the control input calculated at step 1, and the state at the current time point and calculates the degrees of risk of the state at the current time point with respect to the constraint condition. For step 3, the information processing apparatus 100 goes to step 4 if at least one or more of the degrees of risk calculated at step 2 is equal to or greater than a threshold value, or goes to step 5 if none of the degrees of risk is equal to or greater than the threshold value.

For step 4, the information processing apparatus 100 determines that the control input is 0, and goes to the process at step 7. For step 5, the information processing apparatus 100 calculates the variance-covariance matrix used for the policy, based on the degree of risk calculated at step 2 and the lower limit value of the constraint satisfaction rate preset by the user. For step 6, the information processing apparatus 100 probabilistically determines the control input according to a probability distribution for the mean value calculated at step 1 and the variance-covariance matrix calculated at step 5 are used. For example, the probability distribution is a Gaussian distribution. For step 7, the information processing apparatus 100 applies the control input determined at step 4 or 6 to the controlled object 110.

As a result, the information processing apparatus 100 may automatically adjust the range for determining the control input according to the degree of risk. Therefore, the information processing apparatus 100 may assure that the probability of the state of the controlled object 110 satisfying the constraint condition becomes equal to or greater than the preset lower limit value at all time points in an episode during learning of the policy through the episode-type reinforcement learning.

In operation example 1, the controlled object 110, the immediate cost, the constraint condition, and the control purpose are defined by equations (1) to (14), and problem setting is performed. Additionally, the characteristics related to the reinforcement learning and the controlled object 110 assumed in operation example 1 are defined by equations (15) to (20).

$$x_{k+1} = f(x_k) + g(x_k)u_k \quad (1)$$

Equation (1) defines a model representative of true dynamics of the controlled object 110. The model representative of the true dynamics of the controlled object 110 need not be known. The controlled object 110 is an affine discrete-time nonlinear system that is linear with respect to the control input; k is a time point indicated by a multiple of unit time; k+1 is the next time point after the elapse of unit time from time point k; $x_{k+1}$ is the state at the next time point k+1; $x_k$ is the state at time point k; and $u_k$ is the control input at time point k. Equation (1) indicates a relationship in which the state $x_{k+1}$ at the next time point k+1 is determined by the state $x_k$ at time point k and the input $u_k$ at time point k. The functions f and g are unknown. The state is a continuous value. The control input is a continuous value.

$$f: \mathbb{R}^n \to \mathbb{R}^n \quad (2)$$

$$g: \mathbb{R}^n \to \mathbb{R}^{n \times m} \quad (3)$$

Equation (2) indicates that the function f is a function converting an n-dimensional array into an n-dimensional array, and n is known. Equation (3) indicates that the function g is a function converting an n-dimensional array into an n×m-dimensional matrix. An outline letter R indicates a real coordinate space. A superscript of the outline character R indicates the number of dimensions.

$$x_k \in \mathbb{R}^n \quad (4)$$

$$u_k \in \mathbb{R}^n \quad (5)$$

Equation (4) indicates that the state $x_k$ is n-dimensional, and n is known. The state $x_k$ may directly be observed. Equation (5) indicates that the control input $u_k$ is m-dimensional.

$$c_{k+1} = c(x_k, u_k) \quad (6)$$

Equation (6) is an equation for the immediate cost of the controlled object 110, where $c_{k+1}$ is the immediate cost incurred after unit time according to the input $u_k$ at time point k, and c(•) is a function for obtaining the immediate cost. Equation (6) indicates a relationship in which the immediate cost $c_{k+1}$ is determined by the state $x_k$ at time point k and the input $u_k$ at time point k.

$$c: \mathbb{R}^n \times \mathbb{R}^m \to [0, \infty) \quad (7)$$

Equation (7) indicates that the function c(•) is a function for obtaining a positive value based on an n-dimensional array and an m-dimensional array.

$$h^T x \leq d \quad (8)$$

Equation (8) defines the constraint condition, and x is the state. An array h is set by the user. A superscript T indicates transposition. A variable d is set by the user. The constraint condition is known and is linear with respect to the state x. In operation example 1, the one constraint condition exists.

$$h \in \mathbb{R}^n \quad (9)$$

$$d \in \mathbb{R} \quad (10)$$

Equation (9) indicates that the array h is n-dimensional. Equation (10) indicates that the variable d is a real number.

$$X := \{x \in \mathbb{R}^n | h^T x \leq d\} \quad (11)$$

Equation (11) represents a set X of states x satisfying the constraint condition. In the following description, an interior point of X may be denoted by $X^{int}$, and $x^* \in X^{int}$ satisfying $f(x^*) = x^*$ and $x^* \in X^{int}$ satisfying $c(x^*, 0) = 0$ exist.

$$J = \sum_{k=0}^{\infty} \gamma^k c_{k+1} \quad (12)$$

$$\gamma \in (0, 1] : \text{discount rate} \quad (13)$$

Equation (12) is an equation indicative of a cumulative cost J and defines a control purpose of the reinforcement learning. The control purpose of the reinforcement learning is to minimize the cumulative cost J and to learn a policy for determining the control input to minimize the cumulative cost J. The learning of the policy is an update of the parameter ω providing the policy, and γ is a discount rate. Equation (13) indicates that γ is a value between 0 and 1.

$$Pr\{h^T x_k \leq d\} \geq \eta \quad (14)$$

Equation (14) defines the control purpose of the reinforcement learning as assuring that the constraint satisfaction rate at all time points k≥1 is made equal to or greater than a lower limit value η∈(0.5, 1) with respect to the constraint condition. Pr(•) indicates a probability of satisfaction of the condition in (•).

$$x^{k+1} \simeq A x_k + B u_k \quad (15)$$

Equation (15) defines a linear approximation model of the controlled object 110. For example, the linear approximation model is a linear nominal model. It is assumed that the linear approximation model of the controlled object 110 is known. In the following description, "assumption 1" may denote an assumption that the linear approximation model of the controlled object 110 is known. A and B are coefficient matrixes.

$$A \in \mathbb{R}^{n \times n} \quad (16)$$

$$B \in \mathbb{R}^{n \times m} \quad (17)$$

Equation (16) indicates that the coefficient matrix A is n×n-dimensional (has n rows and n columns). Equation (17) indicates that the coefficient matrix B is n×m-dimensional (has n rows and m columns).

$$e(x, u; f, g, A, B) := f(x) + g(x)u - (Ax + Bu) = :$$
$$[e_1(x, u; f, g, A, B), \ldots, e_n(x, u; f, g, A, B)]^T \quad (18)$$

$$\bar{e}_i \geq \sup_{x \in \mathbb{R}^n, u \in \mathbb{R}^m} |e_i(x, u; f, g, A, B)| \quad (19)$$

Equation (18) defines an error function indicative of a modeling error of the linear approximation model of the controlled object 110 representing true dynamics of the controlled object 110, and $e_i$ is an error (i=1, 2, . . . , n). It is assumed for equation (18) that bar{$e_i$}<∞ satisfying equation (19) exists and is known, and bar { } indicates that a bar is added to an upper portion of a character. In the following description, "assumption 2" may denote an assumption that bar{$e_i$}<∞ satisfying equation (19) exists and is known. Assumption 2 indicates that the error ea has a known upper bound.

It is assumed that if x∈X, then f(x)∈X. In the following description, "assumption 3" may denote an assumption that if x∈X, then f(x)∈X. As depicted in FIG. 6, assumption 3 indicates that if the state x satisfies the constraint condition and the control input is 0 at any time point, the state x after a transition also satisfies the constraint condition at the next time point. For example, when the current state is a state 601 in a real coordinate space 600 and the control input is set to 0, a transition to an interior point of the set X such as a state 602 may occur; however, a transition to an exterior point of the set X such as a state 603 does not occur. Therefore, when the control input is 0, it may be assured that the constraint satisfaction rate for the state after the transition becomes equal to or greater than the lower limit value.

$$h^T B \neq 0 \quad (20)$$

It is assumed that equation (20) holds with respect to the coefficient matrix of the linear approximation model of the controlled object 110 and the constraint condition. In the following description, "assumption 4" may denote an assumption that equation (20) holds with respect to the coefficient matrix of the linear approximation model of the controlled object 110 and the constraint condition.

In the problem setting described above, the controlled object 110 is linear with respect to the control input, and the constraint condition is linear with respect to the state. Therefore, a degree of variance of the control input possible at any time point is correlated with a degree of variance of the state possible at the next time point. Therefore, as depicted in FIG. 7, by adjusting the degree of variance of the control input possible at any time point, the degree of variance of the state possible at the next time point may be controlled, and it may be assured that the constraint satisfaction rate for the state at the next time point is made equal to or greater than the lower limit value. For example, as depicted in a graph 700, the probability density of the state x may be controlled such that the constraint satisfaction rate is set to 99%.

Description will be made of examples of operations performed by the information processing apparatus 100 under the problem setting and assumptions 1 to 4 described above. According to the problem setting, equation (21) holds.

$$x_{k+1} = f(x_k) + g(x_k)u_k = Ax_k + Bu_k + e(x_k, u_k) \quad (21)$$

In this case, for step 1, the information processing apparatus 100 uses the parameter ω providing the policy and a state basis function φ(•) and calculates, by equation (22), a mean value $\mu_k$ of the control input that is output at the current time point for the state at the current time point, where $\mu_k$ is m-dimensional.

$$\mu_k = \phi(x_k)^T \omega \quad (22)$$

For step 2, the information processing apparatus 100 calculates, by equation (23), a predicted value of the state including an error at the next time point, based on model information indicative of the linear approximation model of the controlled object 110 and the state at the current time point. The information processing apparatus 100 calculates, by equation (24), a degree of risk of the state at the current time point, based on the predicted value of the state including the error at the next time point. In this equation, ε=[$ε_1$, . . . , $ε_n$]′ holds; ε is n-dimensional, and $ε_i$=bar{$e_i$} or −bar{$e_i$} holds. The universal set of ε is denoted as E.

$$\bar{x}_{k+1}^\epsilon = Ax_k + B\mu_k + \epsilon \quad (23)$$

$$r_k^\epsilon = -(d - h^T \bar{x}_{k+1}^\epsilon) \quad (24)$$

For step 3, the information processing apparatus 100 goes to a process at step 4 if equation (25) holds for the degree of risk calculated at step 2 or goes to a process at step 5 if equation (25) does not hold.

$$\neg(r_k^\epsilon < 0, \forall \epsilon \in E) \quad (25)$$

For step 4, the information processing apparatus 100 determines the control input $U_k$=0 and goes to a process at step 7.

For Step 5, the information processing apparatus 100 calculates the variance-covariance matrix by equations (26) and (27), based on the degree of risk calculated at step 2 and the lower limit value of the constraint satisfaction rate. $I_m$ is an m×m-dimensional unit matrix. $\phi^{-1}(\bullet)$ is an inverse normal cumulative distribution function.

$$\sum_k = \sigma_k^2 I_m \quad (26)$$

$$\sigma_k = \min_\epsilon \frac{1}{\|h^T B\|_2 \Phi^{-1}(\eta)} |r_k^\epsilon| \quad (27)$$

For step 6, the information processing apparatus 100 sets $\mu_k$ calculated at step 1 and $\Sigma_k$ calculated at step 5 as the mean value and the variance-covariance matrix, respectively, to generate a Gaussian probability density function. The information processing apparatus 100 uses the Gaussian probability density function to probabilistically determine the control input $u_k$ with equation (28).

$$u_k \sim N(\mu_k, \Sigma_k) \quad (28)$$

For step 7, the information processing apparatus 100 applies the control input $u_k$ determined at step 4 or 6 to the controlled object 110. As a result, the information processing apparatus 100 may automatically adjust the range for determining the control input according to the degree of risk during use of the reinforcement learner 101. Therefore, the information processing apparatus 100 may assure that the probability of the state of the controlled object 110 satisfying the constraint condition becomes equal to or greater than the preset lower limit value at all time points in the episode during learning of the policy through the episode-type reinforcement learning. FIG. 8 will then be described.

In the example of FIG. 8, η=0.99 is used. As depicted in FIG. 8, when the current state is a state 801 in the real coordinate space 600, the state at the next time point is the interior point of the set X such as a state 802 with the probability η=0.99 or is the exterior point of the set X such as a state 803 with the probability 1−η=0.01 according to the information processing apparatus 100. Therefore, the information processing apparatus 100 may assure that the constraint condition is satisfied with the probability η or more. On the other hand, when the current state is a state 804 in the real coordinate space 600, the information processing apparatus 100 sets the control input to 0, which causes a shift to the interior point of the set X such as a state 805 and therefore, may assure that the constraint condition is always satisfied. From the above, the information processing apparatus 100 may assure that the constraint condition is satisfied with the probability q or more at all time points in the episode.

Although the controlled object 110 satisfies assumption 3 alone in this description, the present invention is not limited hereto. For example, a controller for satisfying assumption 3 may be designed in advance and combined with the controlled object 110 so that the controlled object 110 satisfies assumption 3. This may increase the number of cases of the controlled objects 110 to which the information processing apparatus 100 may be applied.

Although the model representative of true dynamics of the controlled object 110 is unknown in this description, the present invention is not limited hereto. For example, the model representative of true dynamics of the controlled object 110 may be known. In this case, the information processing apparatus 100 may calculate the predicted value and the degree of risk of the state by using the model representative of true dynamics without using the linear approximation model and may improve the accuracy of making the constraint satisfaction rate equal to or greater than the lower limit value η during use of the reinforcement learner 101.

Although an exact upper limit of the error is known in this description, the present invention is not limited hereto. For example, while the exact upper limit of the error is not known, an upper limit larger than the exact upper limit of the error may be known. Even in this case, the information processing apparatus 100 may perform the reinforcement learning such that the constraint satisfaction rate is made equal to or greater than the lower limit value.

A specific example of the operation of the information processing apparatus 100 will be described with an actual example of a control problem. The specific example of the operation of the information processing apparatus 100 will be described by using a two-variable function defined by equations (29) and (30) as an example. Equation (29) satisfies f(0)=0.

$$f = \begin{bmatrix} f_1(x) \\ f_2(x) \end{bmatrix} \begin{bmatrix} 0.3x_1 - 0.4\sin x_2 \\ -0.1x_2 + 0.2(\cos x_1 - 1) \end{bmatrix} \quad (29)$$

$$x = [x_1, x_2]^T \in \mathbb{R}^2 \quad (30)$$

A matrix δf/δx(x) having $\delta f_i/\delta x_j$ as an ij component is defined by equation (31). Therefore, the Frobenius norm $\|\delta f/\delta x(x)\|_F$ is defined by equation (32).

$$\frac{\partial f}{\partial x}(x) = \begin{bmatrix} 0.3 & -0.4\cos x_2 \\ -0.2\sin x_1 & -0.1 \end{bmatrix} \quad (31)$$

$$\left\|\frac{\partial f}{\partial x}(x)\right\|_F = \frac{1}{10}\sqrt{4\sin^2 x_1 + 16\cos^2 x_2 + 10} \quad (32)$$

Furthermore, from $|\sin(x_1)| \le 1$ and $|\cos(x_2)| \le 1$, equation (33) holds for an arbitrary x, and x is two-dimensional. Therefore, a function f is a contraction map in the entire two-dimensional real coordinate space.

$$\left\|\frac{\partial f}{\partial x}(x)\right\|_F = \frac{1}{10}\sqrt{4\sin^2 x_1 + 16\cos^2 x_2 + 10} \le \frac{1}{10}\sqrt{30} < 1 \quad (33)$$

Assuming that the state at time point k is $x_k=[x_{1k},x_{2k}]^T$ and the control input at the same time point k is $u_k$, the model representative of true dynamics of the controlled object 110 is defined as a nonlinear difference equation by equation (34) using the function f, where $g=[1,1]^T$. The state $x_k$ is two-dimensional. The control input $u_k$ is a real number.

$$x_{k+1}=f(x_k)+gu_k \quad (34)$$

The linear approximation model of the controlled object 110 is defined by equations (35) and (36), and f and g are unknown. A and B are known.

$$x_{k+1} \simeq Ax_k + Bu_k \quad (35)$$

$$A = \begin{bmatrix} 0.3 & 0 \\ 0 & -0.1 \end{bmatrix}, \quad b = \begin{bmatrix} 1 \\ 1 \end{bmatrix} \quad (36)$$

The upper limit of the error function $e_i$ is defined by equations (37) and (38). It is assumed that bar{$e_1$}=0.4 and bar{$e_2$}=0.4 are known. In other words, assumption 2 holds.

$$\sup_{x \in \mathbb{R}^2, u \in \mathbb{R}} |0.4\sin x_2| = 0.4 \quad (37)$$

$$\sup_{x \in \mathbb{R}^2, u \in \mathbb{R}} |0.2(\cos x_1 - 1)| = 0.4 \quad (38)$$

The constraint condition for the state is assumed as $x_1 \le 10$. In other words, by using $h^T=[1,0]$ and d=10, the set X of the states satisfying the constraint is defined by equation (39).

$$X=\{x \in \mathbb{R}^2 | h^T x \le d\} \quad (39)$$

Assumption 3 holds due to the fact that the function f is the contraction map in the entire two-dimensional real coordinate space and has a fixed point as the origin, and a shape of X. An initial state is assumed as $x_0=[5,5]^T$. Because of $h^T B \ne 0$, the coefficient matrix of the linear approximation model and the constraint condition satisfy assumption 4. The immediate cost is defined by equation (40). $Q=1.0 \times 10^5 I_2$ and R=1 are assumed.

$$c_{k+1} = \begin{cases} (f(x_k) + gu_k)^T Q(f(x_k) + gu_k) + Ru_k^2 & \text{if } |x_{1_k}| \le 10 \\ (T - k - 1)\{(f(x_k) + gu_k)^T Q(f(x_k) + gu_k) + Ru_k^2\} & \text{otherwise} \end{cases} \quad (40)$$

The information processing apparatus 100 performs the continuous reinforcement learning by using a reinforcement learning algorithm in which the control input decision method described above is incorporated in a one-step actor-critic. For example, the information processing apparatus 100 assumes T=15 steps to be one episode and in each episode, from an initial state $x_0$, learns the policy for determining the control input minimizing the cumulative cost J of the immediate cost. Step corresponds to a unit of processing of determining the control input and observing the immediate cost at each time point indicated by a multiple of a unit time.

Since θ is defined by equation (41) and ω is defined by equation (42), an estimated value bar{V(x; θ)} of a value function and a mean value μ(x; ω) of a control input u are defined by equation (43) and equation (44). The weight θ is Nθ-dimensional, and ω is Nω-dimensional.

$$\theta = [\theta_1, \ldots, \theta_{N_\theta}]^T \in \mathbb{R}^{N_\theta} \quad (41)$$

$$\omega = [\omega_1, \ldots, \omega_{N_\omega}]^T \in \mathbb{R}^{N_\omega} \quad (42)$$

$$\hat{V}(x; \theta) = \sum_{i=1}^{N_\theta} \phi_i(x)\theta_i \quad (43)$$

$$\mu(x; \omega) = \sum_{i=1}^{N_\omega} \phi_i(x)\omega_i \quad (44)$$

Where, $\varphi_i(\cdot)$ converts a two-dimensional array into a one-dimensional array, $\varphi_i(\cdot)$ is a Gaussian radial basis function defined by equation (45), $c_i$ and $s_i^2 > 0$ are a center point and a variance, respectively, of each basis function, and $c_i$ is two-dimensional.

$$\phi_i(x) = \exp\left(-\frac{\|x - c_i\|^2}{2s_i^2}\right), \quad i = 1, \ldots, N_\theta \quad (45)$$

The information processing apparatus 100 is assumed to determine the control input of each time point by applying the mean value μ(x; ω) calculated by using the state $x_k$ of each time point and the parameter ω according to equation (45). The information processing apparatus 100 is assumed to update the weight θ and the parameter ω by using an immediate cost $c_{k+1}$ at each time point with equations (46) to (48).

$$\delta \leftarrow -c_{k+1} + \gamma \hat{V}(x_{k+1}; \theta) - \hat{V}(x_k; \theta) \quad (46)$$

$$\theta \leftarrow \theta + \alpha\delta \frac{\partial \hat{V}}{\partial \theta}(x_k; \theta) \quad (47)$$

$$\omega \leftarrow \omega + \beta\delta \frac{\partial \log \Pi}{\partial \omega}(u_k | x_k; \omega) \quad (48)$$

Where, $\alpha \in [0,1)$ and $\beta \in [0,1)$ are learning rates, and $\Pi(\cdot)$ is the Gaussian probability density function when $\mu_k$ is the mean value and $\Sigma_k$ is the variance-covariance matrix. When $X_{1_k} > 10$ is satisfied is and the constraint condition is violated, or when k=T is satisfied, the information processing apparatus 100 terminates the current episode, initializes equation (49), and moves to the next episode.

$$\hat{V}(x_{k+1}; \theta) = 0 \quad (49)$$

As a result, the information processing apparatus 100 may automatically adjust the range for determining the control input according to the degree of risk. Therefore, the information processing apparatus 100 may assure that the constraint satisfaction rate becomes equal to or greater than the preset lower limit value at all time points in the episode during learning of the policy through the episode-type reinforcement learning. An effect obtained by the information processing apparatus 100 in the actual example in operation example 1 will be described with reference to FIGS. 9 and 10.

Figure 9:
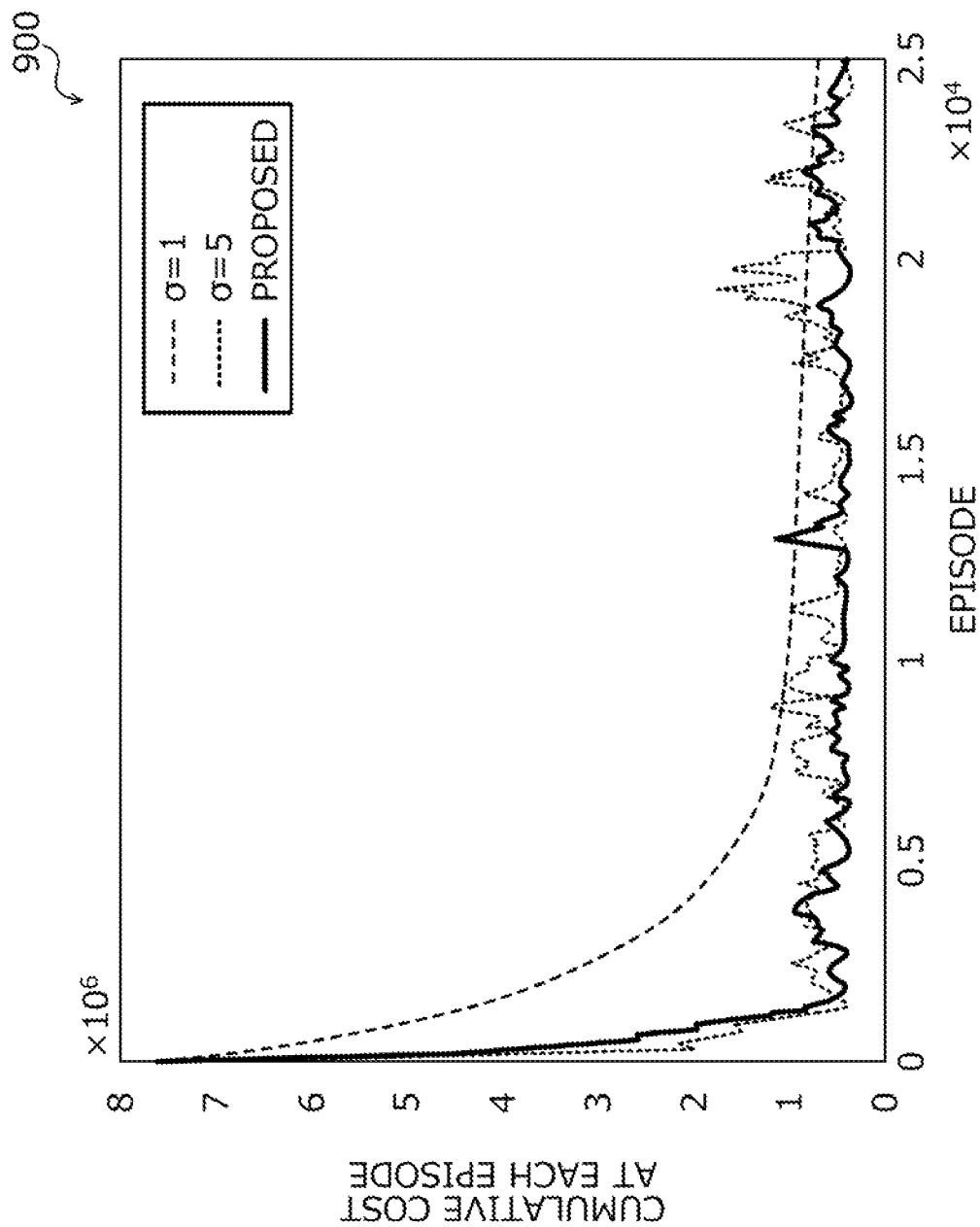
FIG. 9 is an explanatory diagram depicting an effect obtained by the information processing apparatus 100 in operation example 1.
Figure 10:
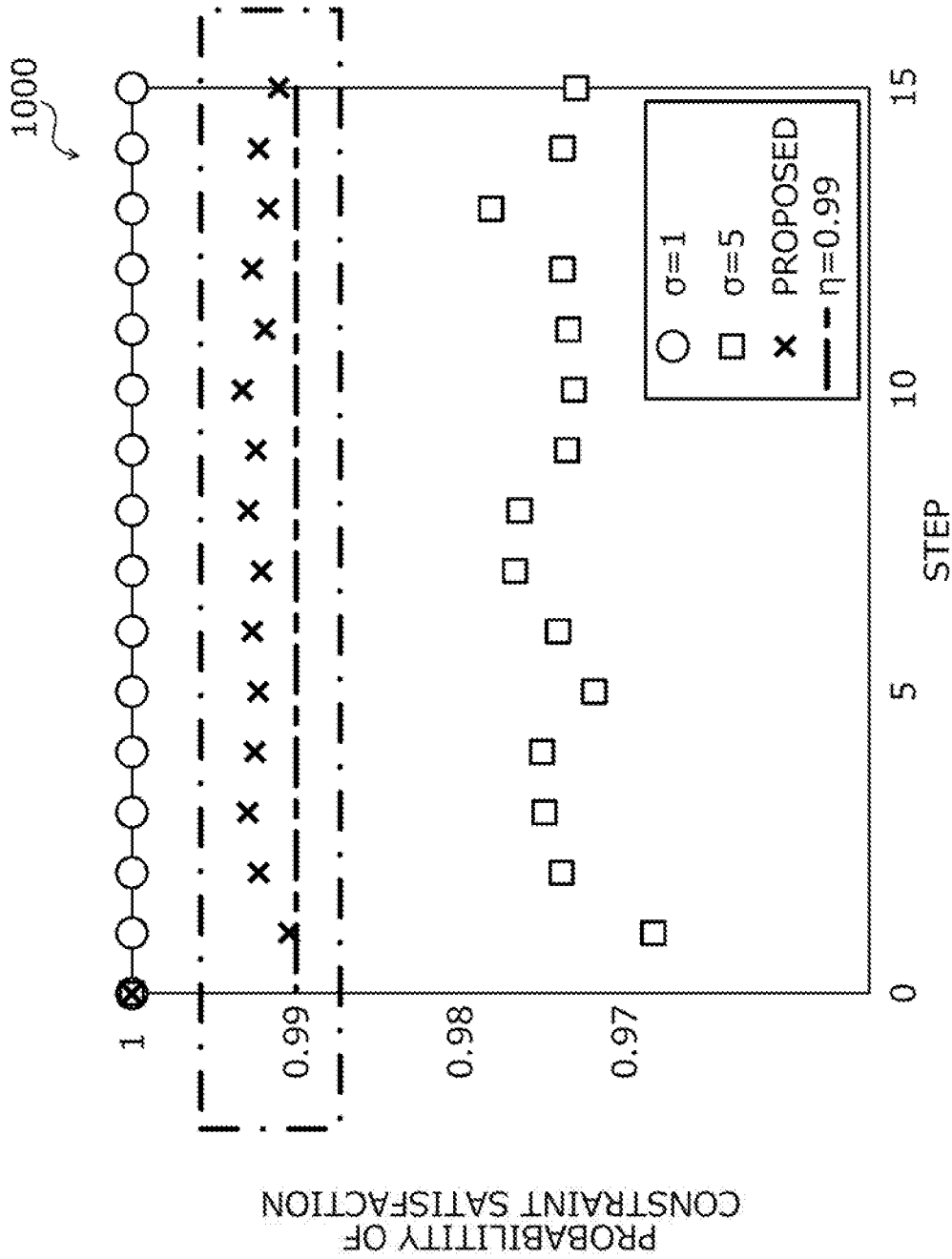
FIG. 10 is an explanatory diagram depicting an effect obtained by the information processing apparatus 100 in operation example 1.

FIGS. 9 and 10 are explanatory diagrams depicting an effect obtained by the information processing apparatus 100 in operation example 1. In FIGS. 9 and 10, the reinforcement learning using the information processing apparatus 100 is compared with conventional reinforcement learning with a Gaussian policy using the Gaussian probability density function with the standard deviation set to a fixed value ρ={1, 5}. In the reinforcement learning using the information processing apparatus 100 and the conventional reinforcement learning, the lower limit value of the constraint satisfaction rate is set to η=0.99 as depicted in equation (50).

$$Pr\{h^T x_k \le d\} \ge \eta = 0.99 \quad (50)$$

A graph 900 of FIG. 9 depicts a cumulative cost in each of multiple episodes. The horizontal axis indicates the number of episodes. The vertical axis indicates the cumulative cost. "Proposed" indicates the reinforcement learning using the information processing apparatus 100. As depicted in the graph 900, the reinforcement learning using the information processing apparatus 100 may reduce the cumulative cost with a smaller number of episodes as compared to the conventional reinforcement learning with ρ=1 and may improve the learning efficiency of learning an appropriate policy.

A graph 1000 of FIG. 10 depicts the constraint satisfaction rate of each step in the episode. The horizontal axis indicates the steps. The vertical axis indicates the constraint satisfaction rate, which is a value obtained by dividing the number of episodes satisfying the constraint condition by the total number of episodes in each step. As depicted in the graph 1000, the reinforcement learning using the information processing apparatus 100 may assure that the constraint satisfaction rate becomes equal to or greater than the preset lower limit value at all time points in the episode. On the other hand, the conventional reinforcement learning with ρ=5 cannot make the constraint satisfaction rate equal to or greater than the preset lower limit value.

As described above, the information processing apparatus 100 may assure that the constraint satisfaction rate becomes equal to or greater than the preset lower limit value, and may suppress the reduction in the learning efficiency, during learning of the policy through the reinforcement learning.

Although the one constraint condition is set in this description, the present invention is not limited hereto. For example, multiple constraint conditions may be set. If the multiple constraint conditions are not correlated with each other, the information processing apparatus 100 may make the constraint satisfaction rate for each of the constraint conditions equal to or greater than the lower limit value as in operation example 1 so as to make the probability of simultaneous satisfaction of the multiple constraint conditions equal to or greater than the lower limit value. In the following description, the probability of simultaneous satisfaction of multiple constraint conditions may be referred to as "simultaneous satisfaction rate".

Description will be made of a specific example of the controlled object 110 to which the reinforcement learning is applied with reference to FIGS. 11 to 13.

Figure 11:
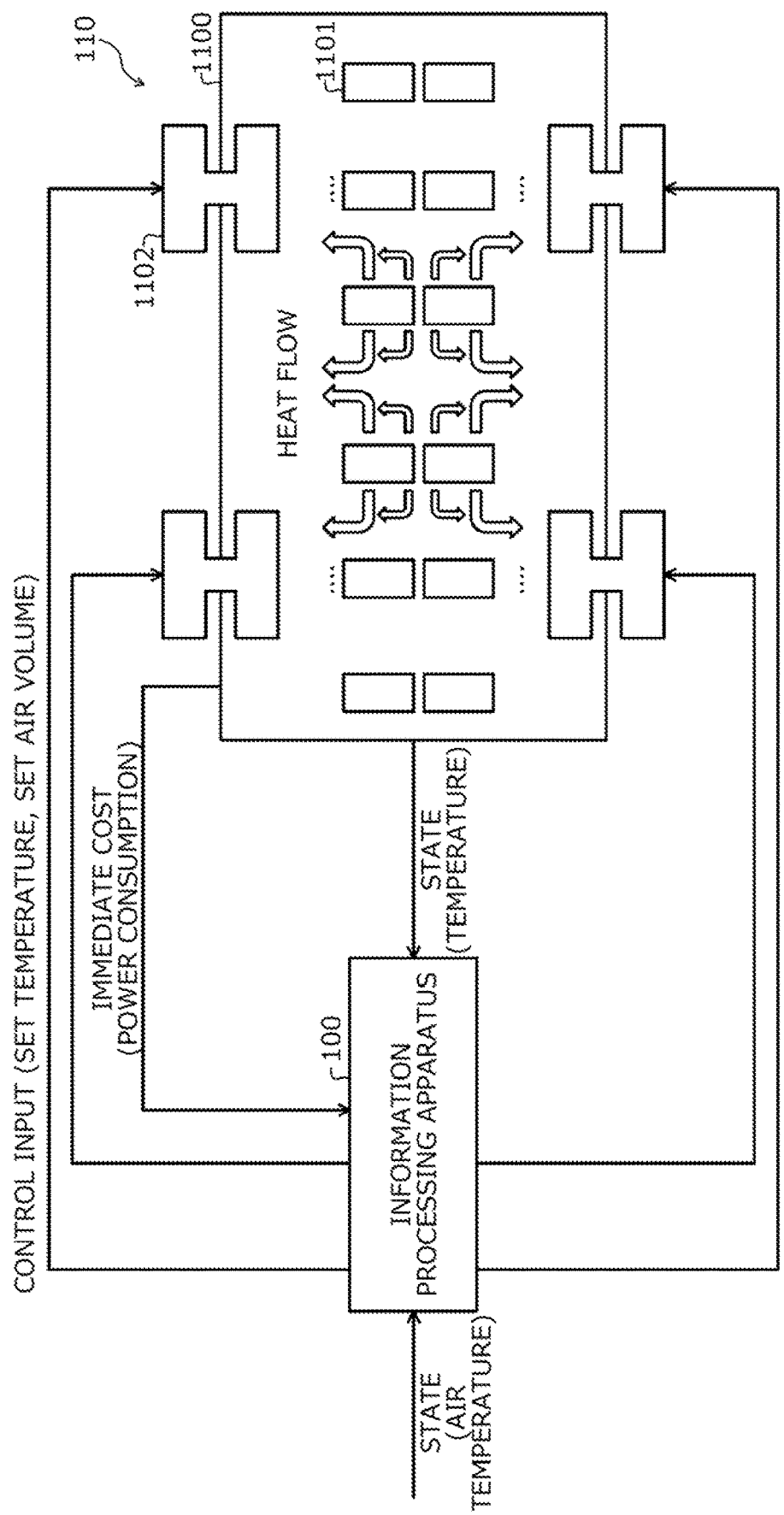
FIG. 11 is an explanatory diagram depicting a specific example of the controlled object 110.
Figure 12:
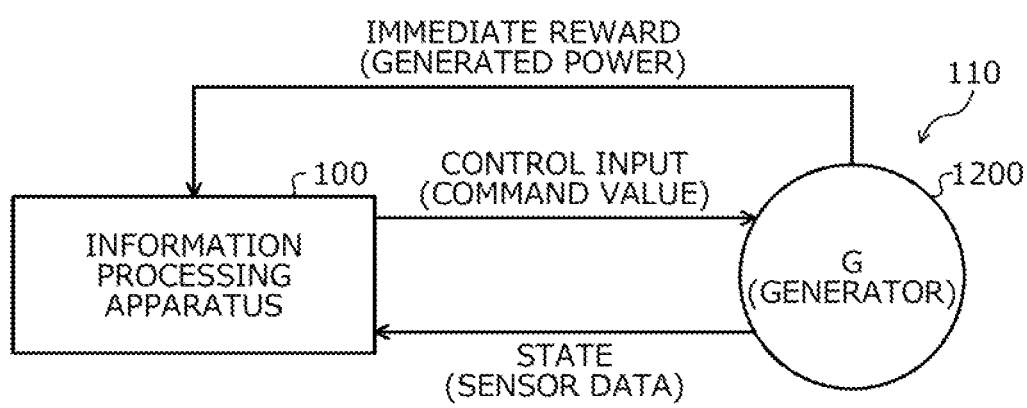
FIG. 12 is an explanatory diagram depicting a specific example of the controlled object 110.
Figure 13:
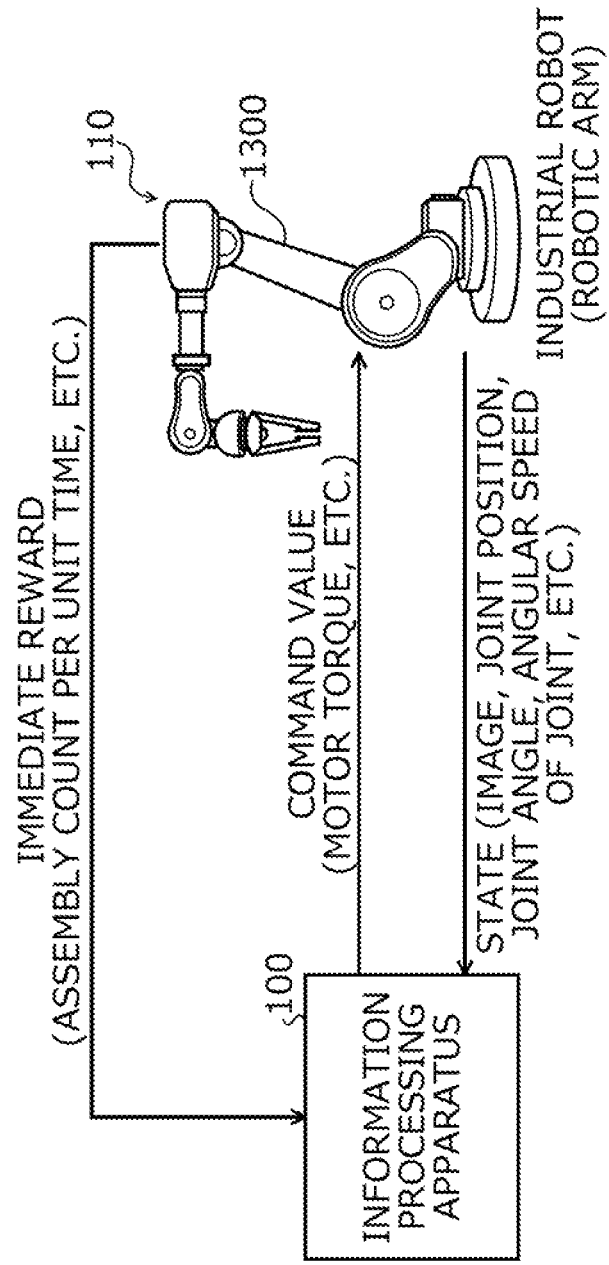
FIG. 13 is an explanatory diagram depicting a specific example of the controlled object 110.

FIGS. 11, 12, and 13 are explanatory diagrams depicting a specific example of the controlled object 110. In the example of FIG. 11, the controlled object 110 is a server room 1100 including a server 1101 acting as a heat source and a cooler 1102 such as CRAC or a chiller. The control input is a set temperature and a set air volume for the cooler 1102. The state is sensor data, etc. from a sensor apparatus disposed in the server room 1100 and is temperature, for example. The state may be data related to the controlled object 110 obtained from other than the controlled object 110 and may be temperature or weather, for example. The immediate cost is power consumption per unit time of the server room 1100, for example. The unit time is 5 minutes, for example. The goal is to minimize the cumulative power consumption of the server room 1100. The state value function represents the value of the control input for the cumulative power consumption of the server room 1100, for example.

In the example of FIG. 12, the controlled object 110 is a power generation facility 1200. The power generation facility 1200 is a wind power generation facility, for example. The control input is a command value for the power generation facility 1200. The command value is a generator torque of a generator in the power generation facility 1200, for example. The state is sensor data from a sensor apparatus disposed in the power generation facility 1200 and is a power generation amount of the power generation facility 1200 or a rotation amount or a rotation speed of a turbine of the power generation facility 1200, for example. The state may be a wind direction or a wind speed with respect to the power generation facility 1200. The immediate reward is an amount of power generation per unit time of the power generation facility 1200, for example. The unit time is 5 minutes, for example. The goal is to maximize a cumulative power generation amount of the power generation facility 1200, for example. The state value function represents a value of the control input for the cumulative power generation amount of the power generation facility 1200, for example.

In the example of FIG. 13, the controlled object 110 is an industrial robot 1300. The industrial robot 1300 is a robotic arm, for example. The control input is a command value for the industrial robot 1300. The command value is a motor torque of the industrial robot 1300, for example. The state is sensor data from a sensor apparatus disposed in the industrial robot 1300 and is, for example, an image captured by the industrial robot 1300, a joint position, a joint angle, or a joint angular speed of the industrial robot 1300. The immediate reward is the number of assemblies of the industrial robot 1300 per unit time, for example. The goal is to maximize the productivity of the industrial robot 1300. The state value function represents the value of the control Input for the cumulative number of assemblies of the industrial robot 1300, for example.

The controlled object 110 may be a simulator of the specific example described above. The controlled object 110 may be a power generation facility other than for wind power generation. The controlled object 110 may be a chemical plant or an autonomous mobile robot, for example.

The controlled object 110 may be a vehicle such as an automobile. The controlled object 110 may be a flying object such as a drone or a helicopter, for example. The controlled object 110 may be a game, for example.

An example of an overall process procedure in operation example 1, executed by the information processing apparatus 100 will be described with reference to FIG. 14. The overall process is implemented by the CPU 401, the storage areas of the memory 402, the recording medium 405, etc., and the network I/F 403 depicted in FIG. 4, for example.

Figure 14:
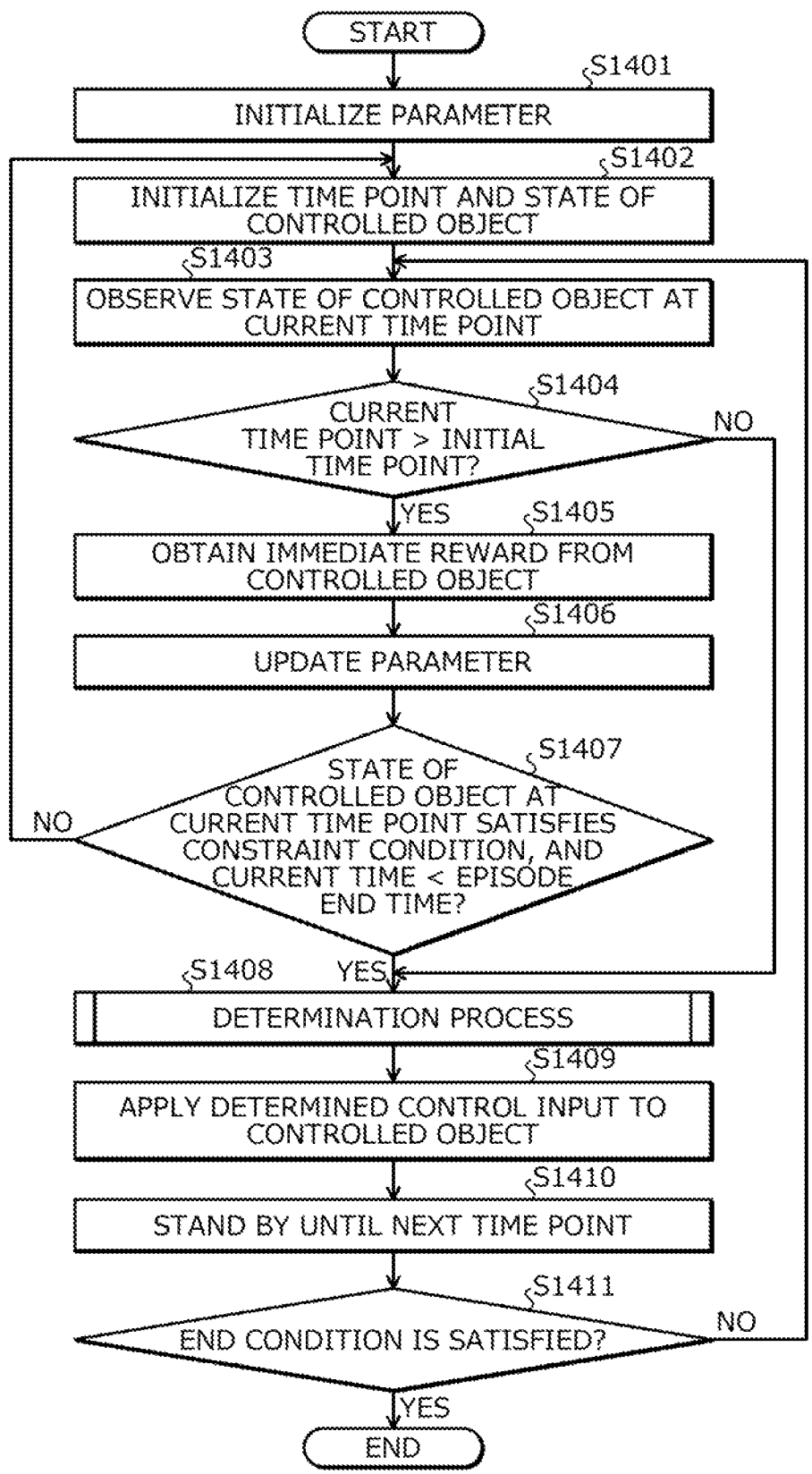
FIG. 14 is a flowchart depicting an example of an overall process procedure in operation example 1.

FIG. 14 is a flowchart depicting an example of the overall process procedure in operation example 1. In FIG. 14, the information processing apparatus 100 initializes the parameter providing the policy (step S1401).

Subsequently, the information processing apparatus 100 initializes the time point and the state of the controlled object 110 (step S1402). The information processing apparatus 100 then observes the state of the controlled object 110 at the current time point (step S1403).

The information processing apparatus 100 determines whether the current time point>the initial time point is satisfied (step S1404). If the current time point>the initial time point is not satisfied (step S1404: NO), the information processing apparatus 100 goes to a process at step S1408. On the other hand, if the current time point>the initial time point is satisfied (step S1404: YES), the information processing apparatus 100 goes to a process at step S1405.

At step S1405, the information processing apparatus 100 obtains the immediate reward from the controlled object 110 (step S1405). Subsequently, the information processing apparatus 100 updates the parameter providing the policy (step S1406). The information processing apparatus 100 then determines whether the state of the controlled object 110 at the current time point satisfies the constraint condition and whether the current time<the episode end time is satisfied (step S1407).

If the constraint condition is not satisfied, or if the current time<the episode end time is not satisfied (step S1407: NO), the information processing apparatus 100 returns to the process at step S1402. On the other hand, if the constraint condition is satisfied and the current time<the episode end time is satisfied (step S1407: YES), the information processing apparatus 100 goes to the process at step S1408.

At step S1408, the information processing apparatus 100 executes a determination process described later with reference FIG. 15 to determine the control input to the controlled object 110 at the current time point (step S1408). The information processing apparatus 100 applies the determined control input to the controlled object 110 (step S1409). The information processing apparatus 100 then stands by until the next time point (step S1410).

Subsequently, the information processing apparatus 100 determines whether an end condition is satisfied (step S1411). If the end condition is not satisfied (step S1411: NO), the information processing apparatus 100 returns to the process at step S1403. On the other hand, if the end condition is satisfied (step S1411: YES), the information processing apparatus 100 terminates the entire process.

An example of a determination process procedure in operation example 1, executed by the information processing apparatus 100 will be described with reference to FIG. 15. The determination process is implemented by the CPU 401, the storage areas of the memory 402, the recording medium 405, etc., and the network I/F 403 depicted in FIG. 4, for example.

Figure 15:
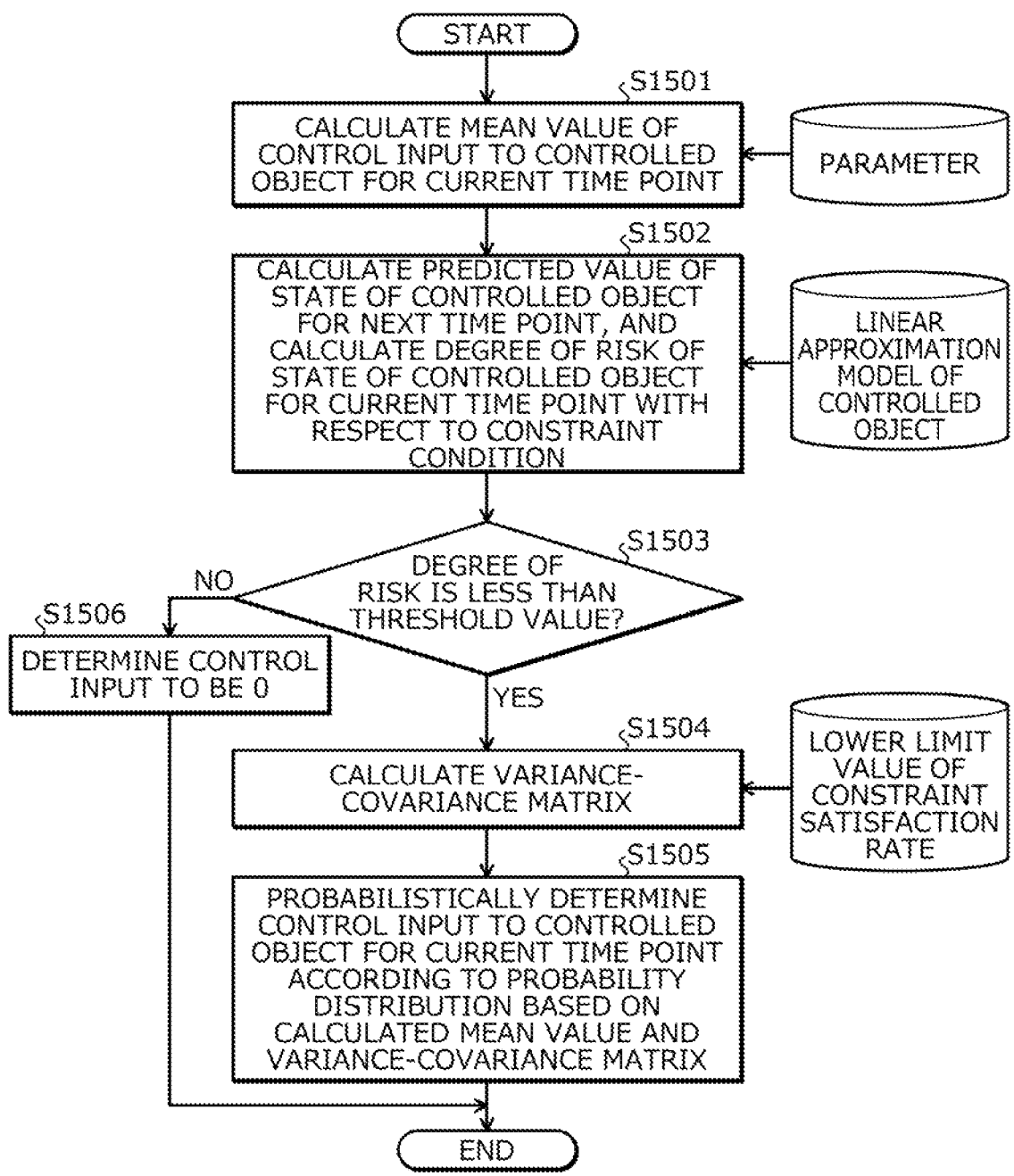
FIG. 15 is a flowchart depicting an example of a determination process procedure in operation example 1

FIG. 15 is a flowchart depicting an example of the determination process procedure in operation example 1. In FIG. 15, the information processing apparatus 100 refers to the parameter and calculates a mean value of the control input to the controlled object 110 for the current time point (step S1501).

Subsequently, the information processing apparatus 100 refers to the linear approximation model of the controlled object 110 and calculates a predicted value of the state of the controlled object 110 for the next time point and further calculates the degree of risk of the state of the controlled object 110 for the current time point with respect to the constraint condition (step S1502).

The information processing apparatus 100 then determines whether the degree of risk is less than a threshold value (step S1503). If the degree is equal to or greater than the threshold value (step S1503: NO), the information processing apparatus 100 goes to a process at step S1506. On the other hand, if the degree of risk is less than the threshold value (step S1503: YES), the information processing apparatus 100 goes to a process at step S1504.

At step S1504, the information processing apparatus 100 refers to the lower limit value of the preset constraint satisfaction rate and calculates the variance-covariance matrix (step S1504). Subsequently, the information processing apparatus 100 probabilistically determines the control input to the controlled object 110 for the current time point according to the probability distribution based on the calculated mean value and variance-covariance matrix (step S1505). The information processing apparatus 100 terminates the determination process.

At step S1506, the information processing apparatus 100 determines the control input to be 0 (step S1506). The information processing apparatus 100 terminates the determination process.

Operation example 2 of the information processing apparatus 100 will be described with reference to FIGS. 16 and 17.

Figure 16:
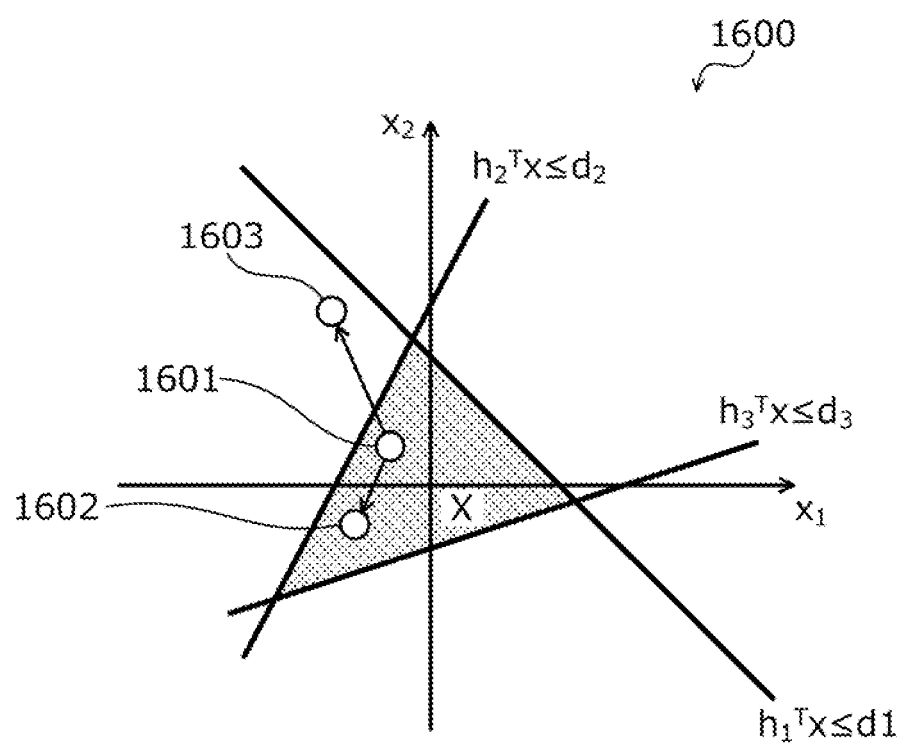
FIG. 16 is an explanatory diagram depicting operation example 2 of the information processing apparatus 100.
Figure 17:
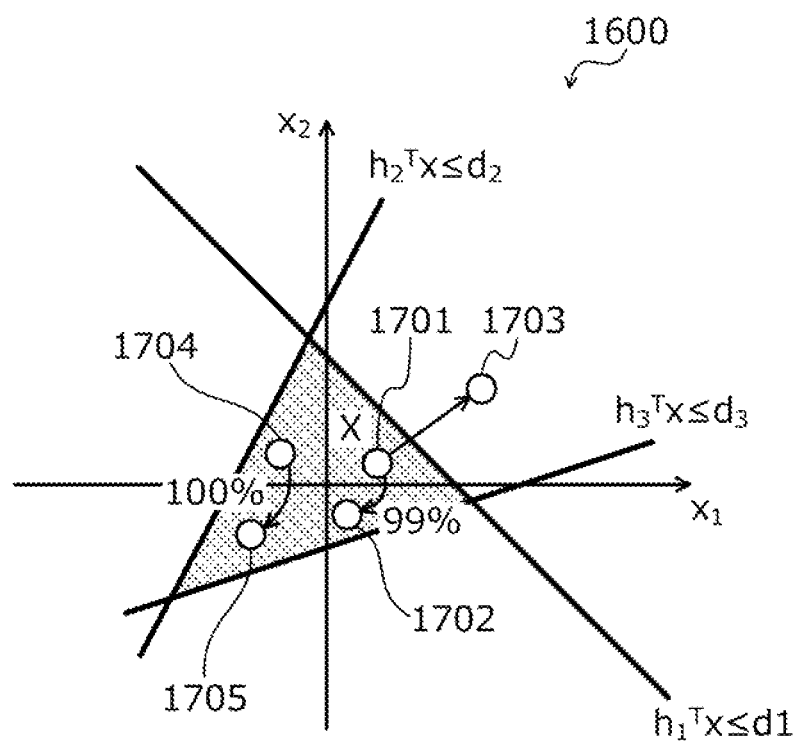
FIG. 17 is an explanatory diagram depicting operation example 2 of the information processing apparatus 100.

FIGS. 16 and 17 are explanatory diagrams depicting operation example 2 of the information processing apparatus 100. Operation example 1 described above corresponds to a case in which one constraint condition is set. On the other hand, operation example 2 corresponds to a case in which multiple constraint conditions are set. In the following description, a flow of operations of the information processing apparatus 100 will first be described, examples of operations of the reinforcement learner 101 will be described with mathematical expressions, and specific examples of the operations of the information processing apparatus 100 will be described with actual examples.

Regarding the reinforcement learning and the controlled object 110, the following four characteristics are assumed. A first characteristic is a property that the reinforcement learning uses a policy of probabilistically determining the control input and may change the variance-covariance matrix of a probability density function used for determining the control input at any timing.

A second characteristic is a property that since the controlled object 110 is linear with respect to the control input and the constraint condition is linear with respect to the state, the variance of the control input at the first time point is stored for the state of the controlled object 110 at the second time point subsequent to the first time point. A third characteristic is a property that when the control input is 0, no transition is made from a state satisfying the constraint condition to a state not satisfying the constraint condition. A fourth characteristic is a property that a probability of at least one of multiple events occurring is equal to or less than a sum of the probabilities of each of the multiple events occurring.

The information processing apparatus 100 uses the characteristics to perform the reinforcement learning. For example, the information processing apparatus 100 determines whether the degree of risk calculated for the current state is at least equal to a threshold value at each time point of the reinforcement learning. When the degree of risk is equal to or greater than the threshold value, the information processing apparatus 100 determines that the control input is 0. On the other hand, when the calculated degree of risk is less than the threshold value, the information processing apparatus 100 calculates a variance-covariance matrix based on the degree of risk under a lower limit value η' of the constraint satisfaction rate for each of the constraint conditions, which is determined from a probabilistic evaluation index preset by the user. The information processing apparatus 100 then probabilistically determines the control input based on the calculated variance-covariance matrix.

For example, the evaluation index indicates the lower limit value q of the probability of simultaneous satisfaction of multiple constraint conditions set by the user. In the following description, the probability of simultaneous satisfaction of multiple constraint conditions may be referred to as "simultaneous satisfaction rate". The lower limit value η' of the constraint satisfaction rate for each of the constraint conditions is calculated by equation (51), where $n_c$ is the number of the constraint conditions.

$$\eta' = 1 - \frac{1-\eta}{n_c} \tag{51}$$

For example, in the reinforcement learning, the information processing apparatus 100 determines and applies the control input to the controlled object 110 while adjusting the range for determining the control input according to the following steps 1 to 7. For step 1, the information processing apparatus 100 calculates a mean value of the control input corresponding to the state at the current time point. For example, the mean value is a center value. For step 2, the information processing apparatus 100 predicts the state at the next time point based on the linear approximation model information, the mean value of the control input calculated at step 1, and the state at the current time point and calculates the degrees of risk of the state at the current time point with respect to the constraint condition. For step 3, the information processing apparatus 100 goes to step 4 if at least one or more of the degrees of risk calculated at step 2 is equal to or greater than a threshold value, or goes to step 5 if none of the degrees of risk is equal to or greater than the threshold value.

For step 4, the information processing apparatus 100 determines that the control input is 0, and goes to the process at step 7. For step 5, the information processing apparatus 100 calculates the variance-covariance matrix used for the policy based on the degree of risk calculated at step 2 and the lower limit value η' of the constraint satisfaction rate related to each of the constraint conditions. For step 6, the information processing apparatus 100 probabilistically determines the control input according to a probability distribution using the mean value calculated at step 1 and the variance-covariance matrix calculated at step 5. For example, the probability distribution is a Gaussian distribution. For step 7, the information processing apparatus 100 applies the control input determined at step 4 or 6 to the controlled object 110.

As a result, even when multiple constraint conditions exist, the information processing apparatus 100 may automatically adjust the range for determining the control input. Therefore, the information processing apparatus 100 may assure that the simultaneous satisfaction rate becomes equal to or greater than the preset lower limit value at all time points in an episode during learning of the policy through the episode-type reinforcement learning.

In operation example 2, the controlled object 110, the immediate cost, the constraint condition, and the control purpose are defined by equations (1) to (7), equation (12), equation (13), and equations (52) to (55), and problem setting is performed. Additionally, the characteristics related to the reinforcement learning and the controlled object 110 assumed in operation example 2 are defined by equations (15) to (19), equation (57), and equation (58).

In the following description, equations (1) to (7), equation (12), and equation (13) are the same as operation example 1 and therefore, will not be described. Equations (15) to (19) are the same as operation example 1 and therefore, will not be described.

$$Hx \leq d \tag{52}$$

$$H = [h_1, \ldots, h_{n_c}]^T \in \mathbb{R}^{n_c \times n} \tag{53}$$

$$d = [d_1, \ldots, d_{n_c}]^T \in \mathbb{R}^{n_c} \tag{54}$$

Equation (52) defines the multiple constraint conditions and x is the state. A matrix H is set by the user. An array d is set by the user. The constraint conditions are known and are linear with respect to the state x. In operation example 2, the multiple constraint conditions exist. Equation (53) indicates that the matrix H is $n_c \times n$-dimensional. Equation (54) indicates that the array d is $n_c$-dimensional.

$$X = \{x \in \mathbb{R}^2 | Hx \leq d\} \tag{55}$$

Equation (55) represents a set X of states x satisfying the multiple constraint conditions. In the following description, an interior point of X may be denoted by $X^{int}$, and $x^* \in X^{int}$ satisfying $f(x^*) = x^*$ and $x^* \in X^{int}$ satisfying $c(x^*, 0) = 0$ exist.

$$Pr\{Hx_k \leq d\} \geq \eta (\Leftrightarrow Pr\{h_j^T x_k \leq d_j, \forall j = 1, 2, \ldots, n_c\} \geq \eta) \tag{56}$$

Equation (56) defines the control purpose of the reinforcement learning as assuring that the simultaneous satisfaction rate at all time points $k \geq 1$ is made equal to or greater than the lower limit value $\eta \in (0.5, 1)$ with respect to the multiple constraint conditions. $Pr(\bullet)$ indicates a probability of satisfaction of the conditions in $(\bullet)$.

It is assumed that if $x \in X$, then $f(x) \in X$. In the following description, "assumption 3" may denote an assumption that if $x \in X$, then $f(x) \in X$. As depicted in FIG. 16, assumption 3 indicates that if the state x simultaneously satisfies the multiple constraint conditions and the control input is 0 at any time point, the state x after a transition also satisfies the constraint condition at the next time point. For example, when the current state is a state 1601 in a real coordinate space 1600 and the control input is set to 0, a transition to an interior point of the set X such as a state 1602 may occur; however, a transition to an exterior point of the set X such as a state 1603 does not occur. Therefore, when the control input is 0 during use of the reinforcement learner 101, it may be assured that the simultaneous satisfaction rate for the state after the transition is increased to be equal to or greater than the lower limit value.

$$h_j^T B \neq 0 \tag{57}$$

$$\forall j = 1, \ldots, n_c \tag{58}$$

It is assumed that equation (57) and equation (58) hold with respect to the coefficient matrix of the linear approximation model of the controlled object 110 and the constraint condition. In the following description, "assumption 4" may denote an assumption that equation (57) and equation (58) holds with respect to the coefficient matrix of the linear approximation model of the controlled object 110 and the constraint condition.

In the problem setting described above, the controlled object 110 is linear with respect to the control input, and the constraint condition is linear with respect to the state. Therefore, a degree of variance of the control input possible at any time point is correlated with a degree of variance of the state of the controlled object 110 possible at the next time point. Therefore, by adjusting the degree of variance of the control input possible for any time point, the degree of variance of the state possible at the next time point may be controlled, and it may be assured that the constraint satisfaction rate for the state at the next time point is increased to be equal to or greater than the lower limit value.

Description will be made of an example of operations of the information processing apparatus 100 under assumptions 1 to 4 describe above. According to the problem setting, equation (21) holds. In this case, for step 1, the information processing apparatus 100 uses the parameter w providing the policy and a state basis function $\varphi(\bullet)$ and calculates, by equation (22), a mean value $\mu_k$ of the control input that is output at the current time point for the state at the current time point, where $\mu_k$ is m-dimensional.

For step 2, the information processing apparatus 100 calculates, by equation (23), a predicted value of the state including an error at the next time point, based on model information indicative of the linear approximation model of the controlled object 110 and the state at the current time point. The information processing apparatus 100 calculates, by equation (59), a degree of risk of the state at the current time point for each constraint condition, based on the predicted value of the state including the error at the next time point. In this equation, $\varepsilon = [\varepsilon_1, \ldots, \varepsilon_n]^t$ holds; $\varepsilon$ is n-dimensional, and $\varepsilon_i = \text{bar}\{e_i\}$ or $-\text{bar}\{e_i\}$ holds. The universal set of $\varepsilon$ is denoted as E.

$$r_{j_k}^\varepsilon = -(d_j - h_j^T \overline{x}_{k+1}^\varepsilon) \tag{59}$$

For step 3, the information processing apparatus 100 goes to a process at step 4 if equation (60) holds for the degree of risk calculated at step 2 or goes to a process at step 5 if equation (60) does not hold.

$$\neg(r_{j_k}^\varepsilon < 0, \forall j = 1, 2, \ldots, n_c, \forall \varepsilon \in E) \tag{60}$$

For step 4, the information processing apparatus 100 determines the control input $U_k = 0$ and goes to a process at step 7. For Step 5, the information processing apparatus 100 calculates the variance-covariance matrix by equations (26), (51), and (61), based on the degree of risk calculated at step 2 and the lower limit value $\eta'$ of the constraint satisfaction rate of the constraint conditions. $I_m$ is an m×m-dimensional unit matrix. $\phi^{-1}(\bullet)$ is an inverse normal cumulative distribution function.

$$\sigma_k = \min_{j, \varepsilon} \frac{1}{\left\| h_j^T B \right\|_2 \Phi^{-1}(\eta')} |r_{j_k}^\varepsilon| \tag{61}$$

For step 6, the information processing apparatus 100 sets $\mu_k$ calculated at step 1 and $\Sigma_k$ calculated at step 5 as the mean value and the variance-covariance matrix, respectively, to generate a Gaussian probability density function. The information processing apparatus 100 uses the Gaussian probability density function to probabilistically determine the control input $u_k$ with equation (28).

For step 7, the information processing apparatus 100 applies the control input $u_k$ determined at step 4 or 6 to the controlled object 110. As a result, the information processing apparatus 100 may automatically adjust the range for determining the control input according to the degree of risk. Therefore, the information processing apparatus 100 may assure that the simultaneous satisfaction rate becomes equal to or greater than the preset lower limit value at all time points in an episode during the learning of the policy through the episode-type reinforcement learning.

In the example of FIG. 17, $\eta=0.99$ is used. As depicted in FIG. 17, when the current state is a state 1701 in a real coordinate space 1600, the state at the next time point is an interior point of the set X such as a state 1702 with the probability $\eta=0.99$ or is an exterior point of the set X such as a state 1703 with the probability $1-\eta=0.01$ according to the information processing apparatus 100. Therefore, the information processing apparatus 100 may assure that the constraint condition is satisfied with the probability $\eta$ or more. On the other hand, when the current state is a state 1704 in the real coordinate space 1600, the information processing apparatus 100 sets the control input to 0, which causes a transition to an interior point of the set X such as a state 1705 and therefore, may assure that the constraint condition is always satisfied. From the above, the information processing apparatus 100 may assure that the constraint condition is satisfied with the probability $\eta$ or more at all time points in the episode.

Although the controlled object 110 satisfies assumption 3 alone in this description, the present invention is not limited hereto. For example, a controller for satisfying assumption 3 may be designed in advance and combined with the controlled object 110 so that the controlled object 110 satisfies assumption 3. This may increase the number of cases of the controlled object 110 to which the information processing apparatus 100 may be applied.

Although the model representative of true dynamics of the controlled object 110 is unknown in this description, the present invention is not limited hereto. For example, the model representative of true dynamics of the controlled object 110 may be known. In this case, the information processing apparatus 100 may calculate the predicted value and the degree of risk of the state by using the model representative of true dynamics without using the linear approximation model and may improve the accuracy of making the constraint satisfaction rate equal to or greater than the lower limit value.

Although an exact upper limit of the error is known in this description, the present invention is not limited hereto. For example, while the exact upper limit of the error is not known, an upper limit larger than the exact upper limit of the error may be known. Even in this case, the information processing apparatus 100 may perform the reinforcement learning such that the constraint satisfaction rate is made equal to or greater than the lower limit value.

A specific example of the operation of the information processing apparatus 100 will be described with an actual example of a control problem. The specific example of the operation of the information processing apparatus 100 will be described by using a two-variable function defined by equations (29) and (30) as an example. Equation (29) satisfies $f(0)=0$.

A matrix $\delta f/\delta x(x)$ having $\delta f_i/\delta x_j$ as an ij component is defined by equation (31). Therefore, the Frobenius norm $\|\delta f/\delta x(x)\|_F$ is defined by equation (32). Furthermore, from $|\sin(x_1)| \le 1$ and $|\cos(x_2)| \le 1$, equation (33) holds for an arbitrary x, and x is two-dimensional. Therefore, a function f is a contraction map in the entire two-dimensional real coordinate space.

Assuming that the state at time point k is $x_k=[x_{1k},x_{2k}]^T$ and the control input at the same time point k is $u_k$, the model representative of true dynamics of the controlled object 110 is defined as a nonlinear difference equation by equation (34) using the function f, where $g=[1,1]^T$. The state $x_k$ is two-dimensional. The control input $u_k$ is a real number. The linear approximation model of the controlled object 110 is defined by equations (35) and (36), and f and g are unknown. A and B are known.

The upper limit of the error function $e_i$ is defined by equations (37) and (38). It is assumed that $\text{bar}\{e_1\}=0.4$ and $\text{bar}\{e_2\}=0.4$ are known. In other words, assumption 2 holds. The constraint condition for the state is assumed as $x_1 \le 10$ and $-10 \le x_1$. In other words, the set X of the states satisfying the constraint is defined by equations (55), (62), and (63).

$$H = \begin{bmatrix} h_1^T \\ h_2^T \end{bmatrix} = \begin{bmatrix} 1 & 0 \\ -1 & 0 \end{bmatrix} \tag{62}$$

$$d = \begin{bmatrix} d_1 \\ d_2 \end{bmatrix} = \begin{bmatrix} 10 \\ 10 \end{bmatrix} \tag{63}$$

Assumption 3 holds due to the function f being a contraction map in the entire two-dimensional real coordinate space and has a fixed point as the origin, and a shape of X. An initial state is assumed as $x_0=[5,5]^T$. Because of $h_j^T B \ne 0$, the coefficient matrix of the linear approximation model and the constraint condition satisfy assumption 4. The immediate cost is defined by equation (40). $Q=1.0 \times 10^5 I_2$ and $R=1$ are assumed.

The information processing apparatus 100 performs the continuous reinforcement learning by using a reinforcement learning algorithm in which the control input decision method described above is incorporated in a one-step actor-critic. For example, the information processing apparatus 100 assumes $T=15$ steps to be one episode and in each episode, from an initial state $x_0$, learns the policy for determining the control input minimizing the cumulative cost J of the immediate cost. Step corresponds to a unit of processing of determining the control input and observing the immediate cost at each time point indicated by a multiple of a unit time.

Since $\theta$ is defined by equation (41) and $\omega$ is defined by equation (42), an estimated value $\text{bar}\{V(x; \theta)\}$ of a value function and a mean value $\mu(x; \theta)$ of a control input u are defined by equation (43) and equation (44). The weight $\theta$ is $N\theta$-dimensional, and $\omega$ is $N\omega$-dimensional. Where, $\varphi_i(\cdot)$ converts a two-dimensional array into a one-dimensional array, $\varphi_i(\cdot)$ is a Gaussian radial basis function defined by equation (45), $c_i$ and $s_i^2>0$ are a center point and a variance, respectively, of each basis function, and $c_i$ is two-dimensional.

The information processing apparatus 100 is assumed to determine the control input of each time point by applying the mean value $\mu(x; \omega)$ calculated by using the state $x_k$ of each time point and the parameter $\omega$ according to equation (45). The information processing apparatus 100 is assumed to update the weight θ and the parameter ω by using an immediate cost $c_{k+1}$ at each time point with equations (46) to (48).

Where, α∈ [0,1) and β∈ [0,1) are learning rates, and Π(•) is the Gaussian probability density function when $\mu_k$ is the mean value and $\Sigma_k$ is the variance-covariance matrix. When $X_{1k}$>10 or −10>$X_{1k}$ is satisfied is and the constraint condition is violated, or when k=T is satisfied, the information processing apparatus 100 terminates the current episode, initializes equation (49), and transitions to the next episode.

In this case, the lower limit value η of the simultaneous satisfaction rate is defined by equation (64) and is η=0.95. Therefore, the lower limit value η' of the constraint satisfaction rate of each of the constraint conditions is defined by equation (65) and is η'=0.975. Therefore, an inequality related to the constraint satisfaction rate of each of the constraint conditions is defined by equation (66).

$$Pr\{Hx_k \leq d\} \geq \eta = 0.95 \quad (64)$$

$$\left(\Leftrightarrow Pr\{h_j^T x_k \leq d_j, j \in \{1, 2\}\} \geq \eta = 0.95\right)$$

$$\eta' = 1 - \frac{1-\eta}{n_c} = 1 - \frac{1-0.95}{2} = 0.975 \quad (65)$$

$$Pr\{h_j^T x_k \leq d_j\} \geq \eta' = 0.975, \ j \in \{1, 2\} \quad (66)$$

As a result, the information processing apparatus 100 may automatically adjust the range for determining the control input according to the degree of risk. Therefore, the information processing apparatus 100 may assure that the constraint satisfaction rate becomes equal to or greater than the preset lower limit value at all time points in the episode during learning of the policy through the episode-type reinforcement learning. An effect obtained by the information processing apparatus 100 in the actual example in operation example 2 will be described with reference to FIGS. 18 and 19.

Figure 18:
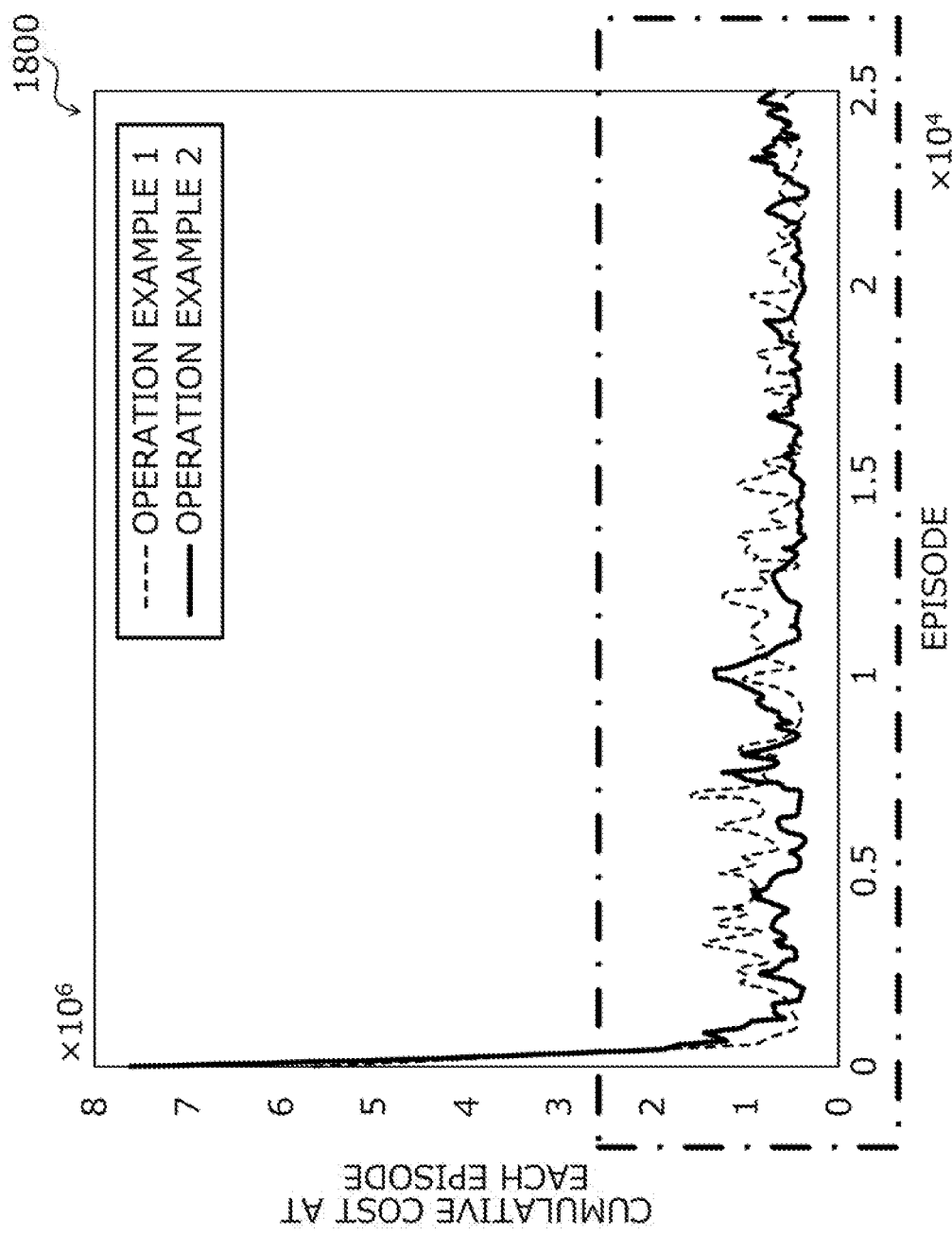
FIG. 18 is an explanatory diagram depicting effects obtained by the information processing apparatus 100 in operation example 2.

FIGS. 18 and 19 are explanatory diagrams depicting effects obtained by the information processing apparatus 100 in operation example 2. In FIGS. 18 and 19, the reinforcement learning for making the simultaneous satisfaction rate equal to or greater than the lower limit with the information processing apparatus 100 in operation example 2 is compared with the reinforcement learning for making the constraint satisfaction rate of each of the constraint conditions equal to or greater than the lower limit individually with the information processing apparatus 100 in operation example 1. The lower limit value is set to r=0.95 as indicated by equation (67).

$$Pr\{h_j^T x_k \leq d_j\} \geq \eta = 0.95, j \in \{1,2\} \quad (67)$$

A graph 1800 of FIG. 18 depicts a cumulative cost in each of multiple episodes. The horizontal axis indicates the number of episodes. The vertical axis indicates the cumulative cost. As depicted in the graph 1800, the information processing apparatus 100 in both operation example 1 and operation example 2 may reduce the cumulative cost with a smaller number of episodes as compared to the conventional reinforcement learning with ρ=1 and may improve the learning efficiency of learning an appropriate policy.

A graph 1900 of FIG. 19 depicts the constraint satisfaction rate of each step in the episode. The horizontal axis indicates the steps. The vertical axis indicates the constraint satisfaction rate, which is a value obtained by dividing the number of episodes satisfying the constraint condition by the total number of episodes in each step. As depicted in the graph 1900, the information processing apparatus 100 in operation example 2 may assure that the simultaneous satisfaction rate becomes equal to or greater than the preset lower limit value at all time points in the episode. As described, the information processing apparatus 100 may assure that the constraint satisfaction rate becomes equal to or greater than the preset lower limit value, and may suppress the reduction in the learning efficiency, during learning of the policy through the reinforcement learning.

An example of an overall process procedure in operation example 2, executed by the information processing apparatus 100 will be described with reference to FIG. 20. The overall process is implemented by the CPU 401, the storage areas of the memory 402, the recording medium 405, etc., and the network I/F 403 depicted in FIG. 4, for example.

FIG. 20 is a flowchart depicting an example of the overall process procedure in operation example 2. In FIG. 20, the information processing apparatus 100 initializes the parameter providing the policy (step S2001).

Subsequently, the information processing apparatus 100 initializes the time point and the state of the controlled object 110 (step S2002). The information processing apparatus 100 then observes the state of the controlled object 110 at the current time point (step S2003).

The information processing apparatus 100 determines whether the current time point>the initial time point is satisfied (step S2004). If the current time point>the initial time point is not satisfied (step S2004: NO), the information processing apparatus 100 goes to a process at step S2008. On the other hand, if the current time point>the initial time point is satisfied (step S2004: YES), the information processing apparatus 100 goes to a process at step S2005.

At step S2005, the information processing apparatus 100 obtains the immediate reward from the controlled object 110 (step S2005). Subsequently, the information processing apparatus 100 updates the parameter (step S2006). The information processing apparatus 100 then determines whether the state of the controlled object 110 at the current time point satisfies all of the constraint conditions and whether the current time point<the episode end time is satisfied (step S2007).

If any of the constraint conditions is not satisfied, or if the current time point<the episode end time is not satisfied (step S2006: NO), the information processing apparatus 100 returns to the process at step S2002. On the other hand, if all the constraint conditions are satisfied and the current time<the episode end time is satisfied (step S2007: YES), the information processing apparatus 100 goes to the process at step S2008.

At step S2008, the information processing apparatus 100 executes a determination process described later with reference FIG. 21 to determine the control input to the controlled object 110 for the current time point (step S2008). The information processing apparatus 100 applies the determined control input to the controlled object 110 (step S2009). The information processing apparatus 100 then stands by until the next time point (step S2010).

Subsequently, the information processing apparatus 100 determines whether the end condition is satisfied (step S2011). If the end condition is not satisfied (step S2011: NO), the information processing apparatus 100 returns to the process at step S2003. On the other hand, if the end condition is satisfied (step S2011: YES), the information processing apparatus 100 terminates the entire process.

An example of a determination process procedure in operation example 2, executed by the information processing apparatus 100 will be described with reference to FIG.

21. The determination process is implemented by the CPU 401, the storage areas of the memory 402, the recording medium 405, etc., and the network I/F 403 depicted in FIG. 4, for example.

FIG. 21 is a flowchart depicting an example of the determination process procedure in operation example 2. In FIG. 21, the information processing apparatus 100 refers to the parameter and calculates a mean value of the control input to the controlled object 110 for the current time point (step S2101).

Subsequently, the information processing apparatus 100 refers to the linear approximation model of the controlled object 110 and calculates a predicted value of the state of the controlled object 110 for the next time point and further calculates the degree of risk of the state of the controlled object 110 for the current time point with respect to each of the constraint conditions (step S2102).

The information processing apparatus 100 then determines whether all of the calculated degrees of risk are less than a threshold value (step S2103). If any of the degrees of risk is equal to or greater than the threshold value (step S2103: NO), the information processing apparatus 100 goes to a process at step S2107. On the other hand, if all of the degrees of risk are less than the threshold value (step S2103: YES), the information processing apparatus 100 goes to a process at step S2104.

At step S2104, the information processing apparatus 100 refers to the lower limit value of the preset simultaneous satisfaction rate and calculates standard deviation for each of the constraint conditions based on the degree of risk of each of the constraint conditions (step S2104). The information processing apparatus 100 then calculates the variance-covariance matrix based on a minimum value of the calculated standard deviation (step S2105).

Subsequently, the information processing apparatus 100 probabilistically determines the control input to the controlled object 110 for the current time point according to the probability distribution based on the calculated mean value and variance-covariance matrix (step S2106). The information processing apparatus 100 terminates the determination process.

At step S2107, the information processing apparatus 100 determines the control input to be 0 (step S2107). The information processing apparatus 100 terminates the determination process.

As described above, according to the information processing apparatus 100, the degree of risk of the state of the controlled object 110 at the current time point may be calculated with respect to the constraint condition based on a predicted value of the state of the controlled object 110 for a future time point obtained from the model information. According to the information processing apparatus 100, the control input to the controlled object 110 at the current time point may be determined from a range defined according to the calculated degree of risk so that the range becomes wider when the calculated degree of risk is smaller. As a result, when the calculated degree of risk is larger, the information processing apparatus 100 may narrow the range for determining the control input to the controlled object 110 so as to suppress an increase in the probability of the state of the controlled object 110 violating the constraint condition at a future time point. On the other hand, when the calculated degree of risk is smaller, the information processing apparatus 100 may expand the range for determining the control input to the controlled object 110 so as to suppress a reduction in learning efficiency of learning of the policy through the reinforcement learning.

According to the information processing apparatus 100, when the calculated degree of risk is equal to or greater than the threshold value, a predetermined value may be determined as the control input to the controlled object 110. According to the information processing apparatus 100, when the calculated degree of risk is less than the threshold value, the control input to the controlled object 110 at the current time point may be determined probabilistically under a probabilistic evaluation index related to satisfaction of the constraint condition. As a result, when the calculated degree of risk is equal to or greater than the threshold value, the information processing apparatus 100 may determine the predetermined value as the control input to the controlled object 110 so as to suppress an increase in the probability of the state of the controlled object 110 violating the constraint condition at a future time point. On the other hand, if the calculated degree of risk is less than the threshold value, the information processing apparatus 100 may probabilistically determine the control input to the controlled object 110 so as to suppress a reduction in the learning efficiency.

According to the information processing apparatus 100, when the calculated degree of risk is less than the threshold value, the mean value possible for the control input to the controlled object 110 at the current time is calculated, and the variance-covariance matrix is calculated under the evaluation index. According to the information processing apparatus 100, the control input to the controlled object 110 at the current time may be determined probabilistically by using the calculated mean value and variance-covariance matrix. As a result, the information processing apparatus 100 may determine the control input to the controlled object 110 according to the Gaussian distribution.

According to the information processing apparatus 100, zero may be used as the predetermined value. As a result, the information processing apparatus 100 may use the characteristics of the controlled object 110 to assure that the state of the controlled object 110 at a future time point satisfies the constraint condition.

According to the information processing apparatus 100, the degree of risk of the state of the controlled object 110 at the current time point may be calculated with respect to each of multiple constraint conditions related to the state of the controlled object 110 based on the predicted value of the state of the controlled object 110 for a future time point. According to the information processing apparatus 100, when the degree of risk calculated with respect to any of the multiple constraint conditions is equal to or greater than the threshold value, a predetermined value may be determined as the control input to the controlled object 110. According to the information processing apparatus 100, when the degree of risk calculated for each of the constraint conditions is less than the threshold value, the control input to the controlled object 110 at the current time point may be determined probabilistically under a probabilistic evaluation index simultaneously satisfying the multiple constraint conditions. As a result, even when multiple constraint conditions exist, the information processing apparatus 100 may improve the probability of the state of the controlled object 110 at a future time point simultaneously satisfying the multiple constraint conditions. The information processing apparatus 100 may suppress a reduction in learning efficiency of learning of the policy through the reinforcement learning.

According to the information processing apparatus 100, the control input may be determined in the episode-type reinforcement learning. As a result, the information processing apparatus 100 may assure that the probability of the state of the controlled object 110 satisfying the constraint condition becomes equal to or greater than a preset lower limit value at all time points in an episode.

According to the information processing apparatus 100, the controlled object 110 may be a wind power generation facility, and the reinforcement learning can be performed for learning the policy for controlling the controlled object 110. As a result, the information processing apparatus 100 may control the wind power generation facility while reducing the probability of violating the constraint condition.

The information processing apparatus 100 may use the model information using a variable indicative of the state of the controlled object 110 at any time point and a variable indicative of the control input to the controlled object 110 to represent linear approximation of a function for the state of the controlled object 110 at the next time point. As a result, the information processing apparatus 100 may perform the reinforcement learning even when a model representative of true dynamics is unknown.

According to the information processing apparatus 100, the predicted value of the state of the controlled object 110 at a future time point may be obtained based on the model information and the upper limit of the error included in the predicted value of the state of the controlled object 110 at a future time point. As a result, the information processing apparatus 100 may accurately obtain the predicted value of the state of the controlled object 110 with consideration of the error included in the predicted value of the state of the controlled object 110.

The information processing apparatus 100 may use the characteristic of the controlled object 110 assuring that when the state at any time point satisfies the constraint condition and the control input at any time point is 0, the state at the next time point satisfies the constraint condition. As a result, the information processing apparatus 100 may use the characteristic of the controlled object 110 to assure that the state of the controlled object 110 at a future time satisfies the constraint condition.

According to the information processing apparatus 100, the controlled object 110 may be an air conditioning facility, and the reinforcement learning may be performed for learning the policy for controlling the controlled object 110. As a result, the information processing apparatus 100 may control the air conditioning facility while reducing the probability of violating the constraint condition.

According to the information processing apparatus 100, the controlled object 110 may be an industrial robot, and the reinforcement learning may be performed for learning the policy for controlling the controlled object 110. As a result, the information processing apparatus 100 may control the industrial robot while reducing the probability of violating the constraint condition.

The reinforcement learning method described in the present embodiment may be implemented by executing a prepared program on a computer such as a personal computer and a workstation. The reinforcement learning program described in the embodiments is stored on a non-transitory, computer-readable recording medium such as a hard disk, a flexible disk, a CD-ROM, an MO, and a DVD, read out from the computer-readable medium, and executed by the computer. The reinforcement learning program described in the embodiments may be distributed through a network such as the Internet.

According to one aspect, a probability that a constraint condition will be satisfied may be improved.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A reinforcement learning method executed by a computer, the reinforcement learning method comprising:
    calculating a degree of risk at a current time, of violating a constraint condition related to a state of a controlled object, the degree of risk being calculated based on a predicted value of the state of the controlled object at a future time point, the predicted value being obtained from model information defining a relationship between the state of the controlled object and a control input to the controlled object; and
    determining the control input to the controlled object at the current time point, from a range defined according to the calculated degree of risk so that the range becomes narrower as the calculated degree of risk increases, wherein
    the determining includes determining the control input to the controlled object to be a predetermined value when the calculated degree of risk is equal to or greater than a threshold value, and probabilistically determining the control input to the controlled object at the current time point under a probabilistic evaluation index related to satisfaction of the constraint condition when the calculated degree of risk is less than the threshold value.

2. The reinforcement learning method according to claim 1, wherein
    the determining includes calculating a mean value possible for the control input to the controlled object at the current time, calculating a variance-covariance matrix under the evaluation index, and probabilistically determining the control input to the controlled object at the current time by using the calculated mean value and variance-covariance matrix, when the calculated degree of risk is less than the threshold value.

3. The reinforcement learning method according to claim 1, wherein the predetermined value is 0.

4. The reinforcement learning method according to claim 1, wherein
    the calculating includes calculating the degree of risk for the state of the controlled object at the current time point with respect to each of a plurality of constraint conditions related to the state of the controlled object, based on the predicted value of the state of the controlled object at the future time point, and
    the determining includes determining the control input to the controlled object to be a predetermined value when the degree of risk calculated with respect to any of the plurality of constraint conditions is equal to or greater than the threshold value, and probabilistically determining the control input to the controlled object at the current time point under a probabilistic evaluation index simultaneously satisfying the plurality of constraint conditions when the degree of risk calculated for each of the constraint conditions is less than the threshold value.

5. The reinforcement learning method according to claim 1, wherein
the calculating and the determining are executed in an episode-type reinforcement learning in which a unit is defined as a period from initialization of the state of the controlled object until the state of the controlled object no longer satisfies the constraint condition, or a period from initialization of the state of the controlled object until a certain time elapses.

6. The reinforcement learning method according to claim 1, wherein
the controlled object is a wind power generation facility, and
the calculating and the determining are executed in a reinforcement learning of a policy for controlling the controlled object, the reinforcement learning using a generator torque of the wind power generation facility as the control input, using at least one of a power generation amount of the power generation facility, a rotation amount of a turbine of the power generation facility, a rotation speed of the turbine of the power generation facility, a wind direction for the power generation facility, and a wind speed for the power generation facility as the state, and using the power generation amount of the power generation facility.

7. The reinforcement learning method according to claim 1, wherein
the model information uses a variable indicative of the state of the controlled object at any time point and a variable indicative of the control input to the controlled object at the any time point, to represent linear approximation of a function for the state of the controlled object at a time point subsequent to the any time point.

8. The reinforcement learning method according to claim 1, further comprising
obtaining, by the computer, a predicted value of the state of the controlled object at the future time point based on the model information and an upper limit of an error included in the predicted value of the state of the controlled object at the future time point.

9. The reinforcement learning method according to claim 1, wherein
the controlled object has a characteristic assuring that when the state of the controlled object at any time point satisfies the constraint condition and the control input to the controlled object at the any time point is 0, the state of the controlled object at a time point subsequent to the any time point satisfies the constraint condition.

10. The reinforcement learning method according to claim 1, wherein
the controlled object is an air conditioning facility.

11. The reinforcement learning method according to claim 1, wherein
the controlled object is an industrial robot.

12. A non-transitory computer-readable storage medium storing therein a reinforcement learning program that causes a computer to execute a process, the process comprising:
calculating a degree of risk at a current time, of violating a constraint condition related to a state of a controlled object, the degree of risk being calculated based on a predicted value of the state of the controlled object at a future time point, the predicted value being obtained from model information defining a relationship between the state of the controlled object and a control input to the controlled object; and
determining the control input to the controlled object at the current time point, from a range defined according to the calculated degree of risk so that the range becomes narrower as the calculated degree of risk increases, wherein
the determining includes determining the control input to the controlled object to be a predetermined value when the calculated degree of risk is equal to or greater than a threshold value, and probabilistically determining the control input to the controlled object at the current time point under a probabilistic evaluation index related to satisfaction of the constraint condition when the calculated degree of risk is less than the threshold value.

13. A reinforcement learning system comprising:
a memory; and
a processor coupled to the memory, the processor configured to:
calculate a degree of risk at a current time, of violating a constraint condition related to a state of a controlled object, the degree of risk being calculated based on a predicted value of the state of the controlled object at a future time point, the predicted value being obtained from model information defining a relationship between the state of the controlled object and a control input to the controlled object; and
determine the control input to the controlled object at the current time point, from a range defined according to the calculated degree of risk so that the range becomes narrower as the calculated degree of risk increases, wherein
the processor is further configured to determine the control input to the controlled object to be a predetermined value when the calculated degree of risk is equal to or greater than a threshold value, and probabilistically determine the control input to the controlled object at the current time point under a probabilistic evaluation index related to satisfaction of the constraint condition when the calculated degree of risk is less than the threshold value.

* * * * *